US008776045B2

(12) United States Patent
Yamada

(10) Patent No.: US 8,776,045 B2
(45) Date of Patent: Jul. 8, 2014

(54) DEVICE, METHOD AND PROGRAM FOR CREATING INSTALLER

(75) Inventor: Takafumi Yamada, Aichi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1719 days.

(21) Appl. No.: 11/679,560

(22) Filed: Feb. 27, 2007

(65) Prior Publication Data
US 2007/0245345 A1 Oct. 18, 2007

(30) Foreign Application Priority Data

Feb. 28, 2006 (JP) ................................ 2006-054197

(51) Int. Cl.
*G06F 9/445* (2006.01)
*G06F 15/177* (2006.01)
(52) U.S. Cl.
USPC ............................ 717/175; 717/176; 709/222
(58) Field of Classification Search
None
See application file for complete search history.

(56) References Cited

U.S. PATENT DOCUMENTS

| 6,822,753 | B1* | 11/2004 | Momose ...................... 358/1.13 |
|---|---|---|---|
| 7,065,564 | B2* | 6/2006 | Machida ....................... 709/222 |
| 7,099,034 | B2* | 8/2006 | Anderson et al. ............ 358/1.15 |
| 7,231,435 | B2* | 6/2007 | Ohta ............................. 709/221 |
| 2002/0083131 | A1* | 6/2002 | Machida ....................... 709/203 |
| 2003/0084132 | A1* | 5/2003 | Ohta ............................. 709/221 |
| 2003/0120624 | A1* | 6/2003 | Poppenga et al. ................. 707/1 |
| 2003/0131149 | A1* | 7/2003 | Sugiura ........................ 709/321 |
| 2004/0227973 | A1* | 11/2004 | Taylor .......................... 358/1.15 |
| 2005/0084314 | A1* | 4/2005 | Anderson et al. ............. 400/625 |
| 2005/0108705 | A1* | 5/2005 | Koyama ........................ 717/174 |
| 2005/0210464 | A1* | 9/2005 | Machida ....................... 717/174 |
| 2006/0176499 | A1* | 8/2006 | Shintoku ...................... 358/1.13 |

FOREIGN PATENT DOCUMENTS

| JP | 2003-202987 A | 7/2003 |
|---|---|---|
| JP | 2003-280840 A | 10/2003 |
| JP | 2005-157479 A | 6/2005 |
| JP | 2005-208748 A | 8/2005 |
| JP | 2006-011950 A | 1/2006 |

OTHER PUBLICATIONS

Canon, imagePROGRAF Media Configuration Tool Guide, published 2005. Retrived from internet: <http://www.komdoch.net/CanonW6400.pdf>, 34 pages.*
Anonymous, "How to user the Network Printer Driver Wizard Software," Brother Solutions Center [online], 2005 [retrieved Sep. 13, 2013], Retrieved from Internet: <http://web.archive.org/web/20051130043001/http://solutions.brother.com/case_studies/en_us/solution/pc_driver_wizard.html>, pp. 1-3.*

(Continued)

*Primary Examiner* — Isaac Tecklu
*Assistant Examiner* — Todd Aguilera
(74) *Attorney, Agent, or Firm* — Banner & Witcoff, Ltd.

(57) ABSTRACT

There is provided a computer readable medium having computer readable instructions stored thereon, which, when executed by a computer, are configured to extract driver configuration files forming a device driver from the computer in which the device driver for controlling a device has been installed, to acquire an initial setting file describing control parameters that have incorporated inputs made in regard to the control parameters to be used by the device driver for controlling the device, and to create an installer which installs a device driver, including the driver configuration files and the initial setting file and controlling the device according to the control parameters described in the initial setting file, in a computer.

9 Claims, 20 Drawing Sheets

(56) References Cited

OTHER PUBLICATIONS

"Installer Customization Wizard for Windows" in: HP LaserJet 4250/4350 Series Software Technical Reference, Hewlett Packard [online], 2004 [retrieved Feb. 20, 2014], Retrieved from Internet: <URL: http://cms.springbranchisd.com/LinkClick.aspx?fileticket=z9yb8fwh29Q%3D&tabid=4359&mid=9058>, pp. 259-272.*

JP Office Action dtd Jul. 5, 2011, JP Appln. 2006-054197, English translation.

* cited by examiner

| SETTING ITEM | SET VALUE |
| --- | --- |
| Printer Name | ○○○○○○○○○○○○ |
| Port Name | ○○○○○○ |
| Set as Default Printer | 1 |
| ⋮ | ⋮ |
| SolutionCenterLink | Enable |
| WEBUpdate | Enable |

DEVICE, METHOD AND PROGRAM FOR CREATING INSTALLER

CROSS-REFERENCE TO RELATED APPLICATION

This application claims priority under 35 U.S.C. §119 from Japanese Patent Application No. 2006-054197, filed on Feb. 28, 2006. The entire subject matter of the application is incorporated herein by reference.

BACKGROUND

1. Technical Field

Aspects of the present invention relate to a processing technique for creating an installer to be used for installing a device driver (for controlling a peripheral device (printer, scanner, MFP (Multi Function Peripheral), etc.)) in a computer.

2. Related Art

In recent years with advanced computer network technologies, networks such as large-scale LANs (Local Area Networks) are commonly constructed in companies, universities, etc. by interconnecting numbers of PCs (Personal Computers). To such a network, peripheral devices like printers, scanners and MFPs (Multi Function Peripherals) are also connected to be shared by a lot of PCs on the network.

Such a network-constructing environment is usually provided with at least one manager or administrator (hereinafter simply referred to as a "manager") for the overall control of not only the network but also PCs and peripheral devices connected to the network, and such a manager generally hopes to previously unify the PCs' settings regarding the control of peripheral devices to desired settings (e.g. a setting for operating printers with their toner saving modes (toner saving functions) constantly turned ON). For this purpose, it is ideal to install device drivers (for the control of peripheral devices) in the PCs, with desired settings previously made to the device drivers (i.e. after making the desired settings to the device drivers).

Incidentally, the installation of a device driver in a PC is generally carried out by use of an installer. The installer includes several driver configuration files as the main body of the device driver, an initial setting file describing control parameters to be used by the device driver for controlling a peripheral device, and an installation program for copying the driver configuration files and the initial setting file to the PC and making necessary settings (an installer including such components is also called an "installation set").

In order to create an installer capable of installing a device driver in a PC with desired settings previously made to the device driver as above, it becomes necessary to rewrite the contents of the initial setting file included in the installer to desired values. However, such rewriting, requiring a thorough knowledge of the contents of the initial setting file which are unique to each device driver, is difficult for people other than the vendor supplying the device driver.

For this reason, a manager hoping for such an installer generally requests the vendor of the device driver to create an installer in which the contents of the initial setting file have been rewritten to desired values. However, the creation of such an installer takes an extremely long time and that can cause an excessive load on the vendor.

Japanese Patent Provisional Publication No. 2003-280840 discloses an installer that lets the user input desired settings at the installation of a printer driver, memorizes the inputted settings, and makes the settings (memorized at the point of the installation) to the printer driver. With the installer, the user is relieved of the need of making settings of the printer driver on each printing since desired settings can be made to the printer driver at the point of the installation. However, even with the installer, the settings have to be made for each PC in which the printer driver is installed, and thus it is still extremely troublesome for the manager of a network to make desired settings for each of the PCs included in the network.

SUMMARY

Aspects of the present invention are advantageous in that a computer readable medium storing a program, an installer creating method and an information processing device, for creating an installer capable of installing a device driver in computers (e.g. PCs) with desired settings previously made to the device driver, can be provided.

BRIEF DESCRIPTION OF THE ACCOMPANYING DRAWINGS

DETAILED DESCRIPTION

General Overview

Figure 1:
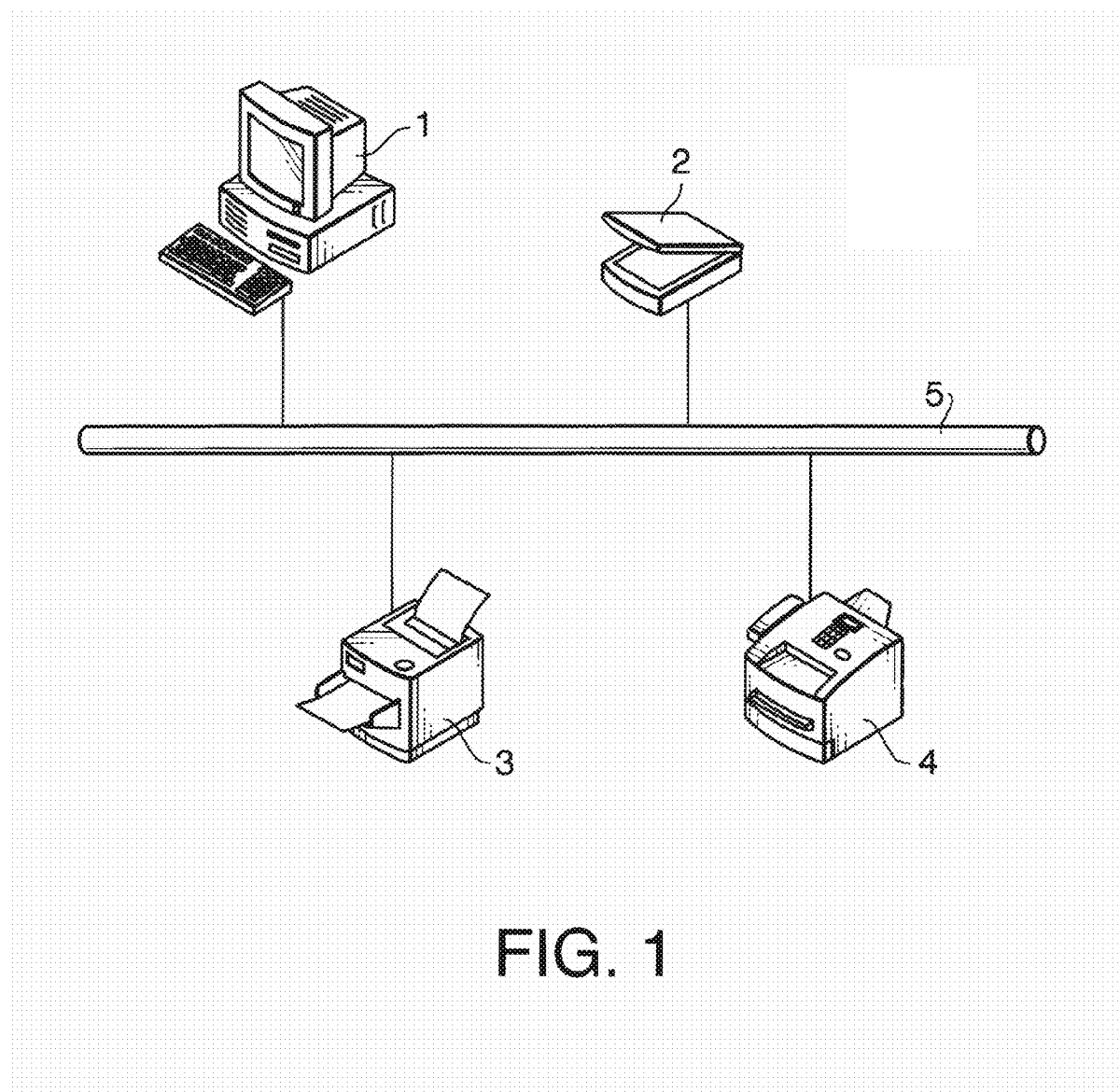
FIG. 1 is a system block diagram showing the general outline of a network environment including an information processing device in accordance with an embodiment of the present invention.

It is noted that various connections are set forth between elements in the following description. It is noted that these connections in general and unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

In accordance with an aspect of the present invention, there is provided a computer readable medium having computer readable instructions stored thereon, which, when executed by a computer, are configured to extract driver configuration files forming a device driver from the computer in which the device driver for controlling a device has been installed, to acquire an initial setting file describing control parameters that have incorporated inputs made in regard to the control parameters to be used by the device driver for controlling the device, and to create an installer which installs a device driver, including the driver configuration files and the initial setting file and controlling the device according to the control parameters described in the initial setting file, in a computer.

With the computer program product configured as above, the user can create an installer of an appropriate device driver capable of controlling the device according to desired control parameters, by use of the computer by inputting the desired control parameters to the computer.

Since the above installer, capable of installing a device driver in computers with desired settings previously made to the device driver, can be created as above not only by the vendor but also by any user, the settings of device drivers installed in computers included in a network can easily be unified to desired settings by the manager of the network, for example, only by distributing the installer created as above to users of the network (i.e. to the computers included in the network).

By the extraction of the driver configuration files forming the device driver currently installed in the computer, the manager of the network can first check whether the operation of the device driver on his/her own computer is normal or not and thereafter create and distribute an installer of the device driver, for example.

Here, the "installation" of the device driver in a computer means copying the driver configuration files and the initial setting file to the computer and making necessary settings. Specifically, when the computer is operating with a Windows® OS (Operating System), the "installation" means storing the driver configuration files and the initial setting file forming the device driver in the "system folder" and registering the device driver in the "registry" as a virtual device.

Therefore, the "driver configuration files forming the device driver currently installed in the computer" have to have been "installed" in the computer as above (being simply stored in a storage unit of the computer is not enough). In cases where the computer is operating with a Windows® OS, for example, the driver configuration files have to have been stored in the "system folder" and the device driver (including the driver configuration files) has to have been registered in the "registry" as a virtual device. This point is significantly different from the case where an installer is created by the vendor supplying the device driver.

In at least one aspect, the instructions are further configured to call up and execute a function of the device driver for displaying a setting screen for receiving inputs made in regard to the control parameters so that an initial setting file describing control parameters that have incorporated the inputs received through the setting screen is acquired.

With the above configuration, the computer program product in accordance with the present invention is relieved of the need of including the function for displaying the setting screen for receiving inputs made in regard to the control parameters and the configuration of the computer program product can be simplified, since the receiving of the inputs made in regard to the control parameters is implemented by calling up and executing the function of the device driver. Further, by use of the setting screen displayed by the function of the device driver, the user, being accustomed to the setting screen usually displayed by the device driver, can easily make the inputs of the control parameters with intuitive understanding of how to use the setting screen.

In accordance with another aspect of the present invention, there is provided a computer program product comprising computer-readable instructions that cause a computer to execute: a selection receiving step of receiving a selection input specifying whether to execute driver installation or installer creation; an installation step, executed when the driver installation is selected in the selection receiving step, of installing a device driver for controlling a device in the computer; and following steps executed when the installer creation is selected in the selection receiving step: a configuration extracting step of extracting driver configuration files forming a device driver from the computer in which the device driver for controlling the device has been installed; a setting acquiring step of acquiring an initial setting file describing control parameters that have incorporated inputs made in regard to the control parameters to be used by the device driver for controlling the device; and an installer creating step of creating an installer which installs a device driver, including the driver configuration files and the initial setting file and controlling the device according to the control parameters described in the initial setting file, in a computer.

With the computer program product configured as above, a function of creating a new installer as above can be added to an installation program. For example, only by receiving an installer containing such an installation program from the vendor, the user can carry out both the installation of a device driver contained in the installer and the creation of a new installer capable of installing the device driver in a computer with desired settings previously made to the device driver.

The installation step may also be configured to install the device driver in the computer so that the device driver controls the device according to the control parameters described in the initial setting file acquired in the setting acquiring step.

With the above configuration, the initial setting file acquired in the setting acquiring step can be used also for the installation step, by which installation of the device driver (contained in the installer together with the installation program) in the computer with desired settings previously made to the device driver, reinstallation of a copy of an existing device driver (already installed in the computer) in the computer with desired settings made to the device driver, etc. become possible.

In accordance with another aspect of the present invention, there is provided an installer creating method comprising: a configuration extracting step of extracting driver configuration files forming a device driver from a computer in which the device driver for controlling a device has been installed; an input receiving step of receiving inputs of control parameters to be used by the device driver for controlling the device; a setting creating step of creating an initial setting file describing control parameters that have incorporated the inputs received by the input receiving step; and an installer creating step of creating an installer which installs a device driver, including the driver configuration files and the initial setting file and controlling the device according to the control parameters described in the initial setting file, in a computer.

In at least one aspect, the input receiving step calls up and executes a function of the device driver for displaying a setting screen for receiving inputs made in regard to the control parameters, and the setting creating step creates an initial setting file describing control parameters that have incorporated the inputs received through the setting screen.

In accordance with another aspect of the present invention, there is provided an information processing device comprising: a configuration extracting unit which extracts driver configuration files forming a device driver from a computer in which the device driver for controlling a device has been installed; an input receiving unit which receives inputs of control parameters to be used by the device driver for controlling the device; a setting creating unit which creates an initial setting file describing control parameters that have incorporated the inputs received by the input receiving unit; and an installer creating unit which creates an installer which installs a device driver, including the driver configuration files and the initial setting file and controlling the device according to the control parameters described in the initial setting file, in a computer.

In at least one aspect, the input receiving unit calls up and executes a function of the device driver for displaying a setting screen for receiving inputs made in regard to the control parameters, and the setting creating unit creates an initial setting file describing control parameters that have incorporated the inputs received through the setting screen.

According to another aspect of the invention, there is provided an installer creating method, comprising: extracting driver configuration files forming a device driver from the computer in which the device driver for controlling a device has been installed; acquiring an initial setting file describing control parameters that have incorporated inputs made in regard to the control parameters to be used by the device driver for controlling the device; and creating an installer which installs a device driver, including the driver configuration files and the initial setting file and controlling the device according to the control parameters described in the initial setting file, in a computer.

With the method configured as above, the user can create an installer of an appropriate device driver capable of controlling the device according to desired control parameters, by use of the computer by inputting the desired control parameters to the computer.

According to another aspect of the invention, there is provided an information processing device, which comprises a configuration extracting unit which extracts driver configuration files forming a device driver from a computer in which the device driver for controlling a device has been installed, an acquiring unit which acquires an initial setting file describing control parameters that have incorporated inputs made in regard to the control parameters to be used by the device driver for controlling the device, and an installer creating unit which creates an installer which installs a device driver, including the driver configuration files and the initial setting file and controlling the device according to the control parameters described in the initial setting file, in a computer.

With the information processing device configured as above, the user can create an installer of an appropriate device driver capable of controlling the device according to desired control parameters, by use of the information processing device by inputting the he desired control parameters to the information processing device.

Embodiment

Referring now to the drawings, a description will be given in detail of a preferred embodiment in accordance with the present invention.

FIG. 1 is a system block diagram showing the general outline of a network environment including an information processing device in accordance with an embodiment of the present invention, in which a scanner 2, a printer 3 and an MFP (Multi Function Peripheral) 4 as peripheral devices are connected to a PC (Personal Computer) 1 as the information processing device via a network 5 such as a LAN (Local Area Network). Incidentally, the peripheral devices 2, 3 and 4 may also be directly (not via a network 5) connected to the PC 1 by use of serial cables, USB cables, etc.

In the PC 1, printer drivers for controlling printer units 20 (see FIG. 3) of the printer 3 and the MFP 4 have been installed. Incidentally, while the printer drivers are taken as examples of device drivers in this embodiment, other types of device drivers such as a scanner driver for controlling the scanner 2 may also be handled similarly in this embodiment.

The printer 3, having a printer function, is a peripheral device capable of printing images, texts, etc. on print sheets (e.g. paper) according to print data (including image data, text data, etc.) transmitted from the PC 1. The scanner 2, having a scanner function, is a peripheral device capable of scanning an image on a document and thereby generating image data.

Figure 3:
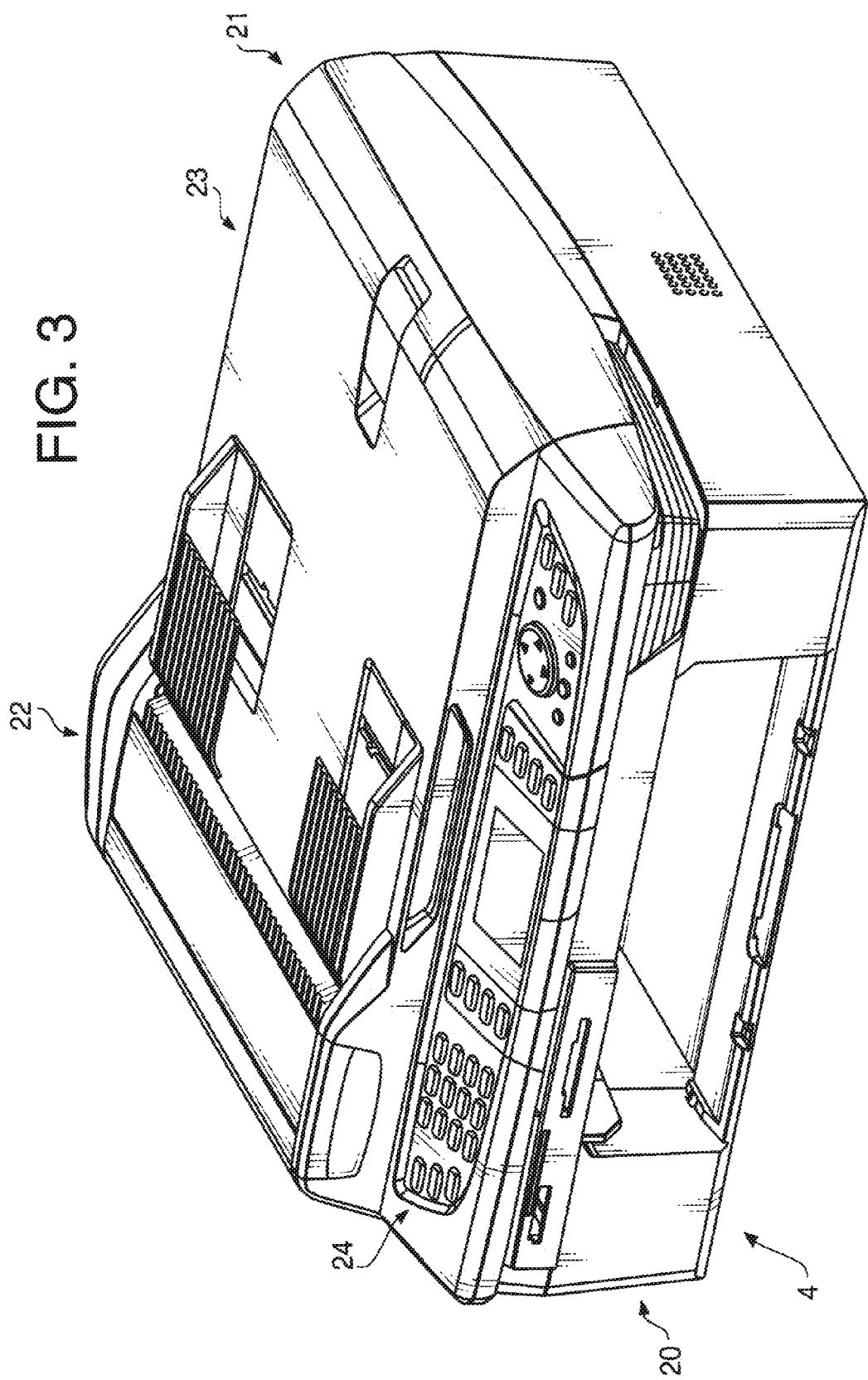
FIG. 3 is a perspective view showing the exterior configuration of an MFP (Multi Function Peripheral) included in the network environment of FIG. 1.

The MFP 4 is a multifunctional device including a printer unit 20 (placed in the lower part of the device), a scanner unit 21 (placed above the printer unit 20), a document cover 23 having an ADF (Automatic Document Feeder) 22, an operation panel 24 (placed in the front part of the top of the device), etc. as shown in FIG. 3 and thereby having the printer function, the scanner function, a copy function, a facsimile function, etc. in one body.

Figure 2:
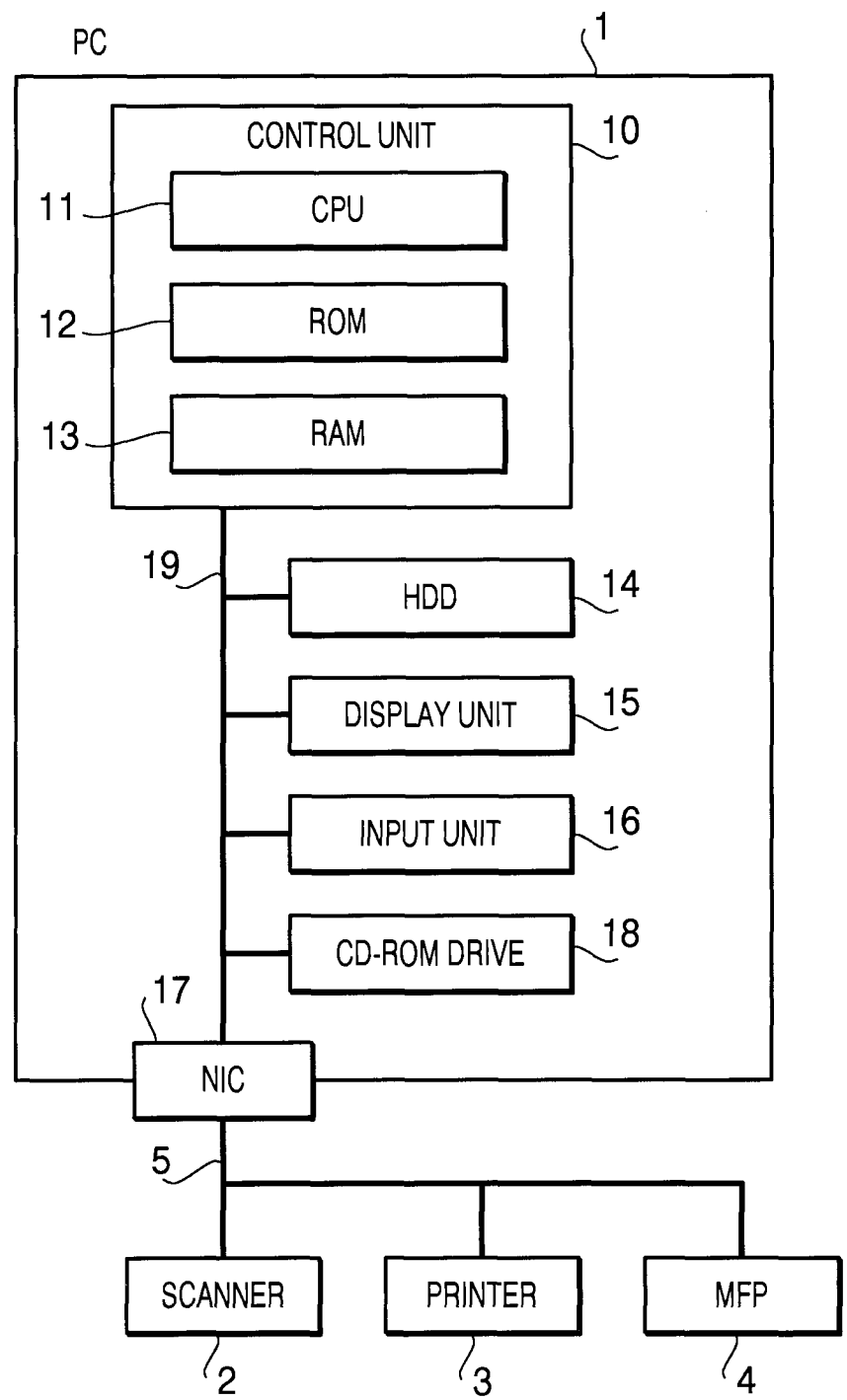
FIG. 2 is a block diagram showing the general composition of a PC as the information processing device.

FIG. 2 is a block diagram showing the general composition of the PC 1 as the information processing device. The PC 1 includes a control unit 10, an HDD (Hard Disk Drive) 14 storing various programs and data, a display unit 15, an input unit 16, a CD-ROM drive 18 for reading out data from a CD-ROM (example of a storage medium), and a NIC (Network Interface Card) 17 (e.g. LAN adapter) for the connection of the PC 1 to the network 5. The components of the PC 1 are connected together by an internal bus 19 to communicate with one another.

Incidentally, the device functioning as the information processing device in the network environment is not restricted to such a PC 1; a terminal device having a computer inside, such as a PDA (Personal Digital Assistant), may also be used as the information processing device.

The display unit 15 includes a display device such as an LCD (Liquid Crystal Display). The display unit 15 is connected to the control unit 10 via an unshown video board or graphic board. On the display unit 15, setting screens (details will be explained later) to be used for setting print conditions (control parameters), etc. of the printer 3 and the MFP 4, a mouse pointer, etc. are displayed. The display on the display unit 15 is implemented by a GUI (Graphical User Interface) function of the PC 1.

The input unit 16 includes input devices such as a keyboard and a mouse. The input unit 16 (keyboard, mouse, etc.) is connected to the control unit 10 via unshown USB (Universal Serial Bus) terminals or PS/2 terminals. The input unit 16 receives the user's inputs for setting the print conditions (control parameters), etc. and sends the user inputs to the control unit 10.

The control unit 10, for the centralized control of the components of the PC 1, is configured as a computer including a CPU (Central Processing Unit) 11, a ROM (Read Only Memory) 12, a RAM (Random Access Memory) 13, etc. In the PC 1, the control unit 10 is the so-called mother board.

An OS (Operating System) has been installed in the PC 1. In the environment of the OS, a process according to steps shown in flow charts of FIGS. 6-12 is realized. In other words, a configuration extracting function, an input receiving function, a setting creating function and an installer creating function are implemented by the execution of the process by the CPU 11.

While the explanation of this embodiment will be given below assuming that a Windows® OS has been installed in the PC 1, the present invention is also applicable to PCs operating with other OS's.

Figure 4:
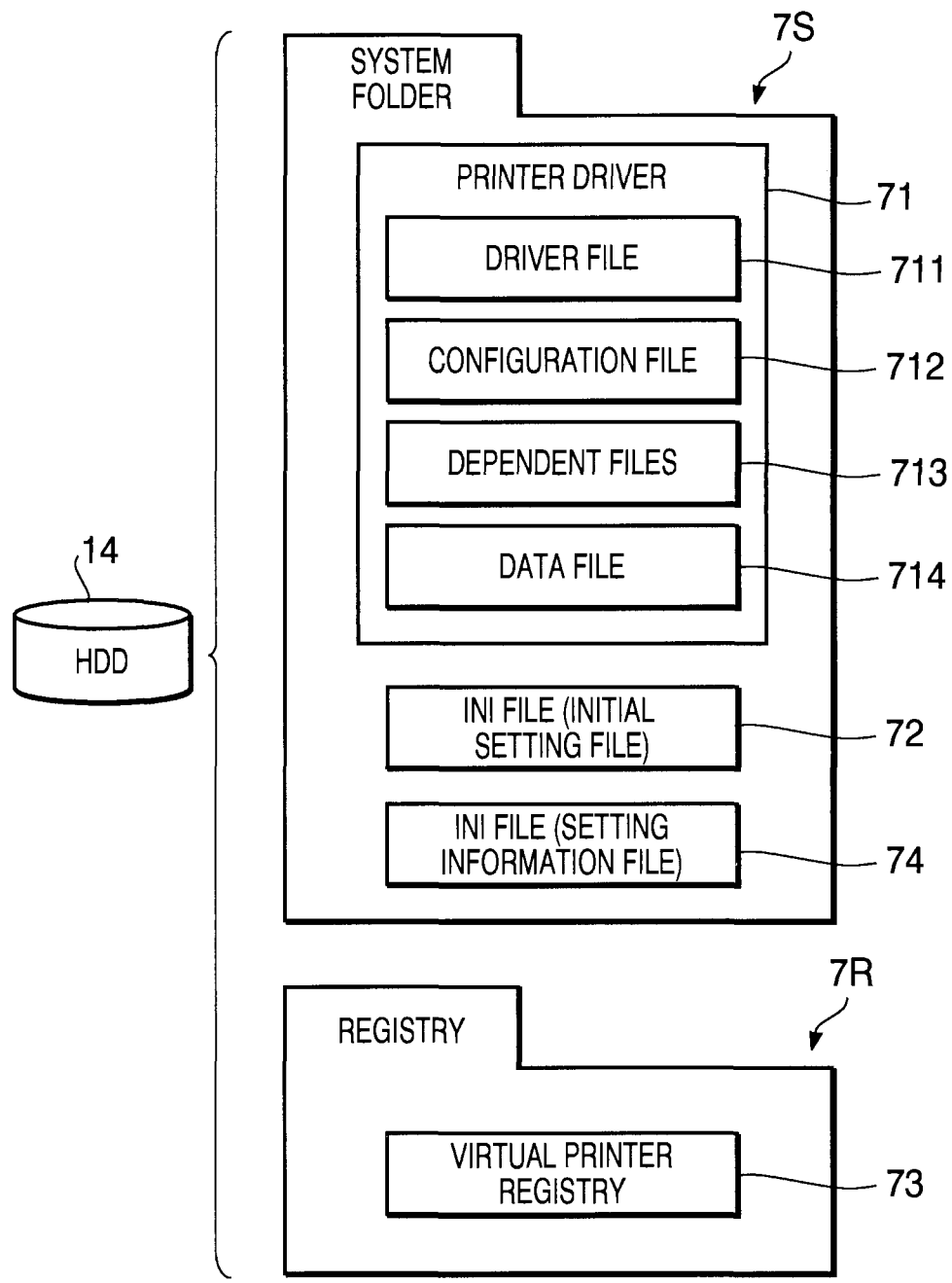
FIG. 4 is a schematic diagram showing data structure of an HDD (Hard Disk Drive) of the PC in which a printer driver has been installed.

The HDD 14 is a device including high-capacity disks (example of storage media) and a read/write unit in one body. As shown in FIG. 4, a system folder 7S (storing various system files, etc. necessary for the operation of the OS), a registry 7R (in which setting data for applications, system files, etc. are recorded), etc. are formed in the HDD 14.

The system folder 7S stores each printer driver (driver main body) 71 which has been installed in the PC 1, together with each INI file (initial setting file) 72 storing information on the print conditions (control parameters), etc. applied to each printer driver 71 and each INI file (setting information file) 74 storing setting information, etc. on each printer driver 71.

Specifically, each printer driver 71 includes a driver file 711 as a main file to be used for the printing, a configuration file 712 as a main file to be used for the display of a UI (User Interface: the setting screens), dependent files 713 as auxiliary files for the main files, and a data file 714 in which all the settable values of the control parameters have been described. The files 711-714 will hereinafter be referred to as "driver configuration files".

Meanwhile, in the registry 7R, a virtual printer registry 73 is formed, in which each printer driver 71 is registered as a virtual printer. In the virtual printer registry 73, information such as the correspondence between each printer driver 71 and a virtual printer name is described.

Figure 5:
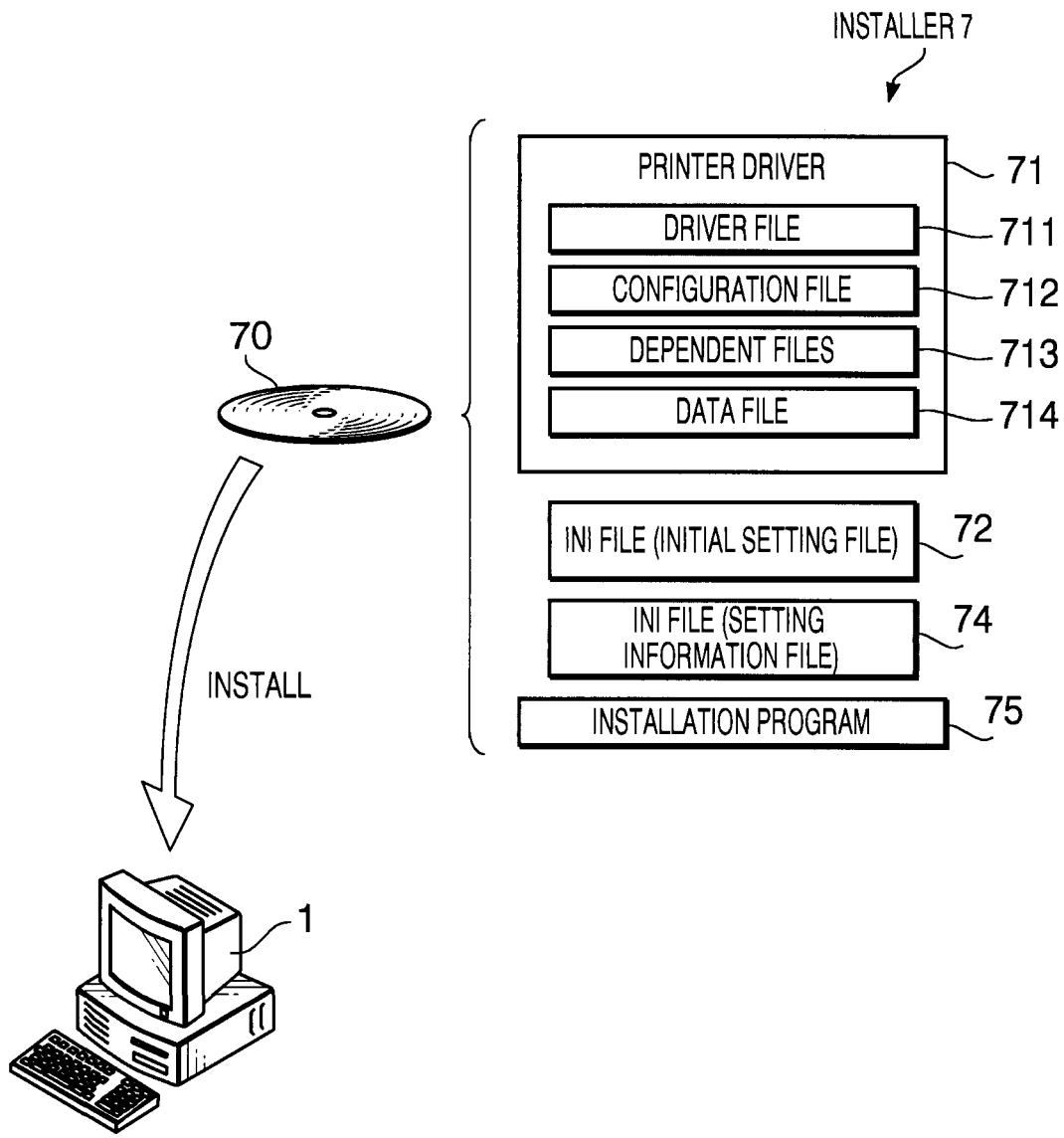
FIG. 5 is a schematic diagram showing data structure of a CD-ROM in which the printer driver has been stored.

Each printer driver 71 explained above is installed in the system folder 7S of the HDD 14 from an installer 7 like the one shown in FIG. 5, for example. The installer 7, which has been stored in a CD-ROM 70 (example of a storage medium), is distributed to the user of the PC 1 and is read out from the CD-ROM 70 by the CD-ROM drive 18. The installer 7 may also be delivered to the PC 1 via the Internet, etc. from a server of a vendor supplying the driver.

The installer 7 includes the aforementioned printer driver 71 and INI files 72 and 74, together with an installation program 75 for installing the printer driver 71 and INI files 72 and 74 in the PC 1. The installation program 75 is loaded in the CPU 11 of the PC 1 and executes a process for copying the printer driver 71 and INI files 72 and 74 to the system folder 7S of the HDD 14 and registering the printer driver 71 in the virtual printer registry 73 in the registry 7R as a virtual printer (virtual device).

Incidentally, the installation program 75 in this embodiment has a function of creating a new installer as will be explained later, in addition to the above installation function.

In the following, a process (installer creating method) which is executed by the installation program 75 (computer program product) will be described referring to FIGS. 6-12, etc.

Figure 6:
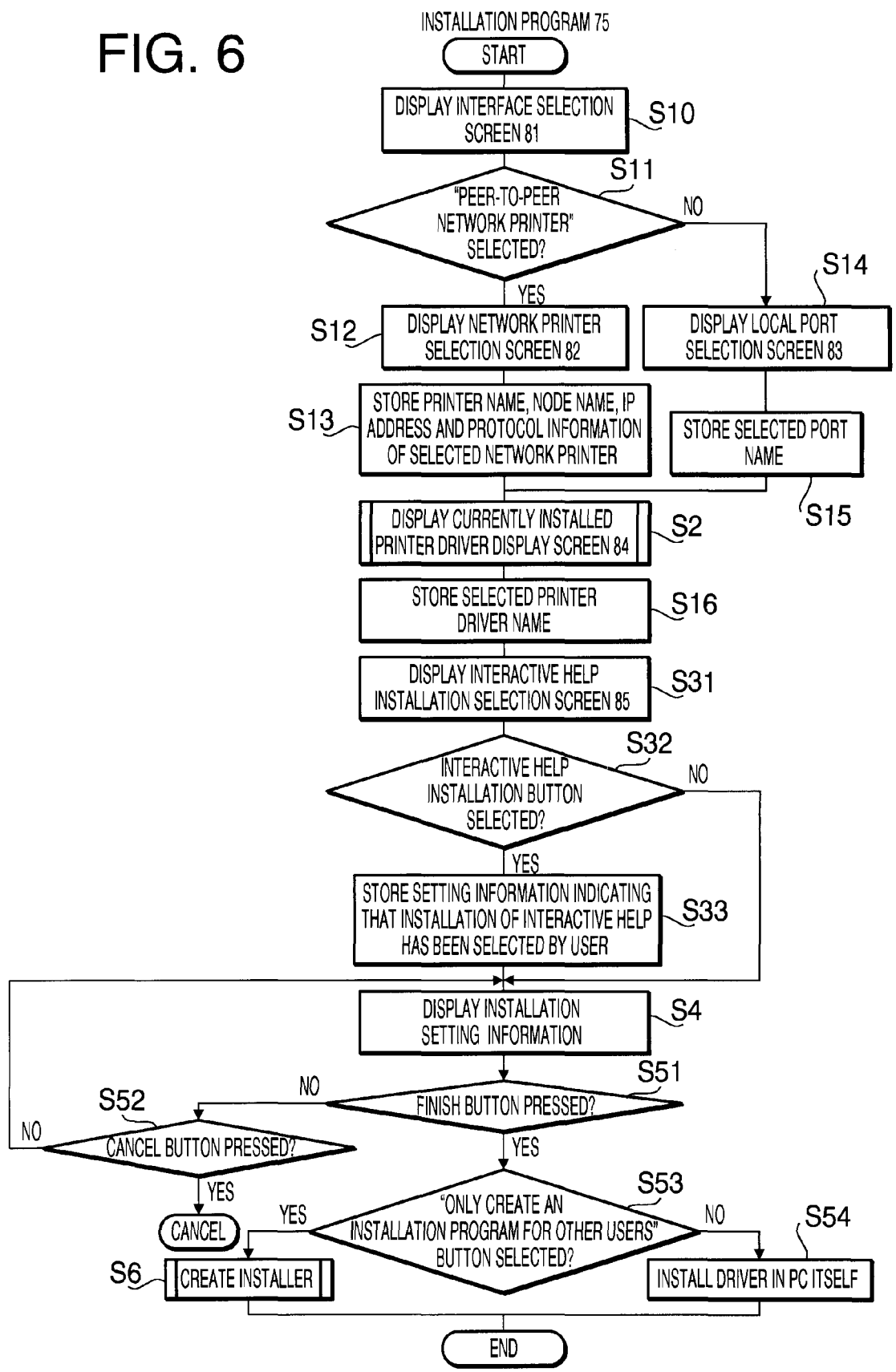
FIG. 6 is a flowchart showing the main routine of a process which is executed by the PC according to an installation program.
Figure 13:
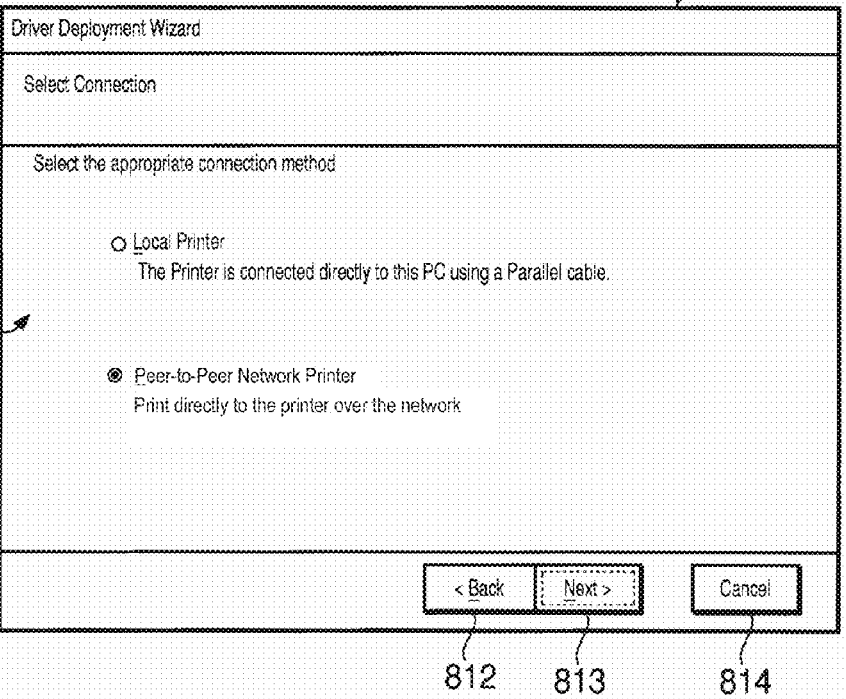
FIG. 13 is a screen image showing an example of an interface selection screen displayed in step S10 in FIG. 6.

FIG. 6 is a flow chart showing the main routine of the installation program 75. The PC 1 activating the installation program 75 first displays an interface selection screen 81 on the display unit 15 to let the user select a connection mode (connection method) of a printer (target printer) to be handled by this process (S10). As shown in FIG. 13, the interface selection screen 81 includes an input window 811 for receiving the user's selection input specifying whether the target printer is a local printer or a network printer, a next button 813 to be pressed for advancing to the next step, a back button 812, and a cancel button 814, etc. The inputs to the selection screen are made by the user by operating the input unit 16 (ditto for other screens).

Here, the "local printer" means a printer that is directly connected to the PC 1 via a serial port, parallel port, USB port, etc. Meanwhile, the "network printer" means a printer that is indirectly connected to the PC 1 via a network 5.

When the next button 813 is pressed by the user, the PC 1 judges which connection mode has been selected in the input window 811 of the interface selection screen 81 (S11).

Figure 14:
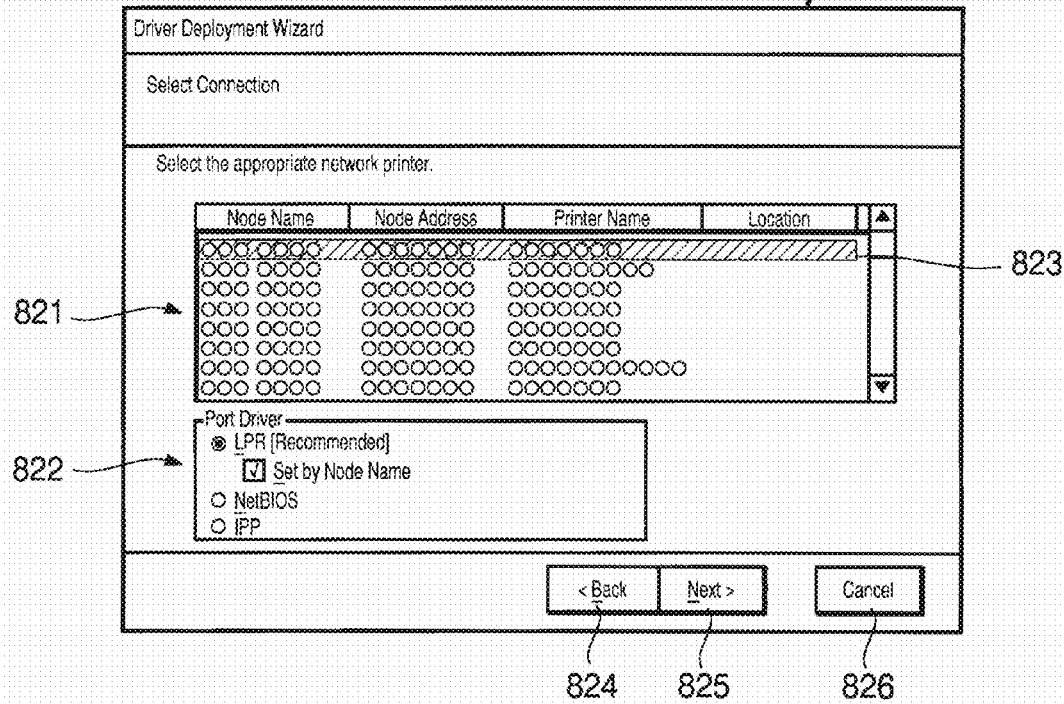
FIG. 14 is a screen image showing an example of a network printer selection screen displayed in step S12 in FIG. 6.

When the target printer is a network printer (S11:YES), the PC 1 displays a network printer selection screen 82 (for receiving a selection of a network printer) on the display unit 15 (S12). As shown in FIG. 14, the network printer selection screen 82 includes a display window 821 for displaying a list of network printers connected to the PC 1 via the network 5, a cursor 823 for letting the user make a selection from the display window 821, a port driver selection window 822, a next button 825 to be pressed for advancing to the next step, a back button 824, and a cancel button 826, etc. When the next button 825 is pressed by the user, the PC 1 stores the printer name, the node name, the IP address and protocol information regarding the selected network printer (S13).

Figure 15:
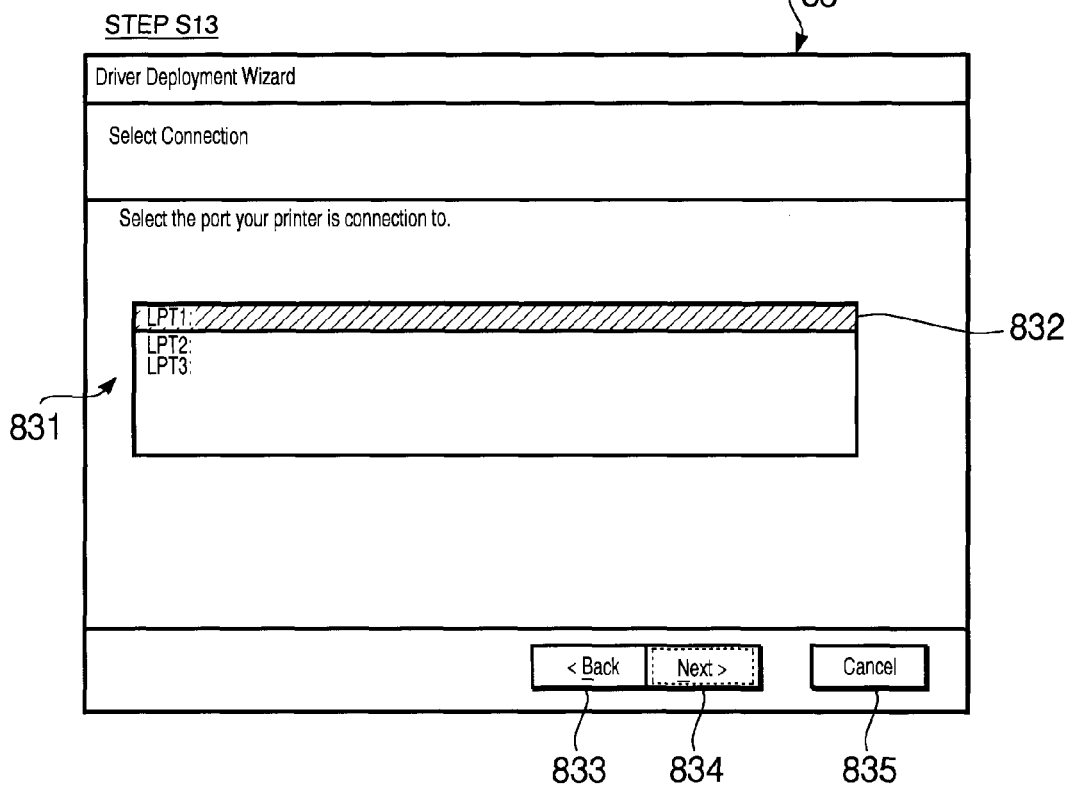
FIG. 15 is a screen image showing an example of a local port selection screen displayed in step S14 in FIG. 6.

On the other hand, when the target printer is a local printer (S11: NO), the PC 1 displays a local port selection screen 83 (for receiving a selection of a local port) on the display unit 15 (S14). As shown in FIG. 15, the local port selection screen 83 includes a display window 831 for displaying a list of local ports of the PC 1, a cursor 832 for letting the user make a selection from the display window 831, a next button 834 to be pressed for advancing to the next step, a back button 833, and a cancel button 835, etc. When the next button 834 is pressed by the user, the PC 1 stores the selected port name (S15).

Figure 16:
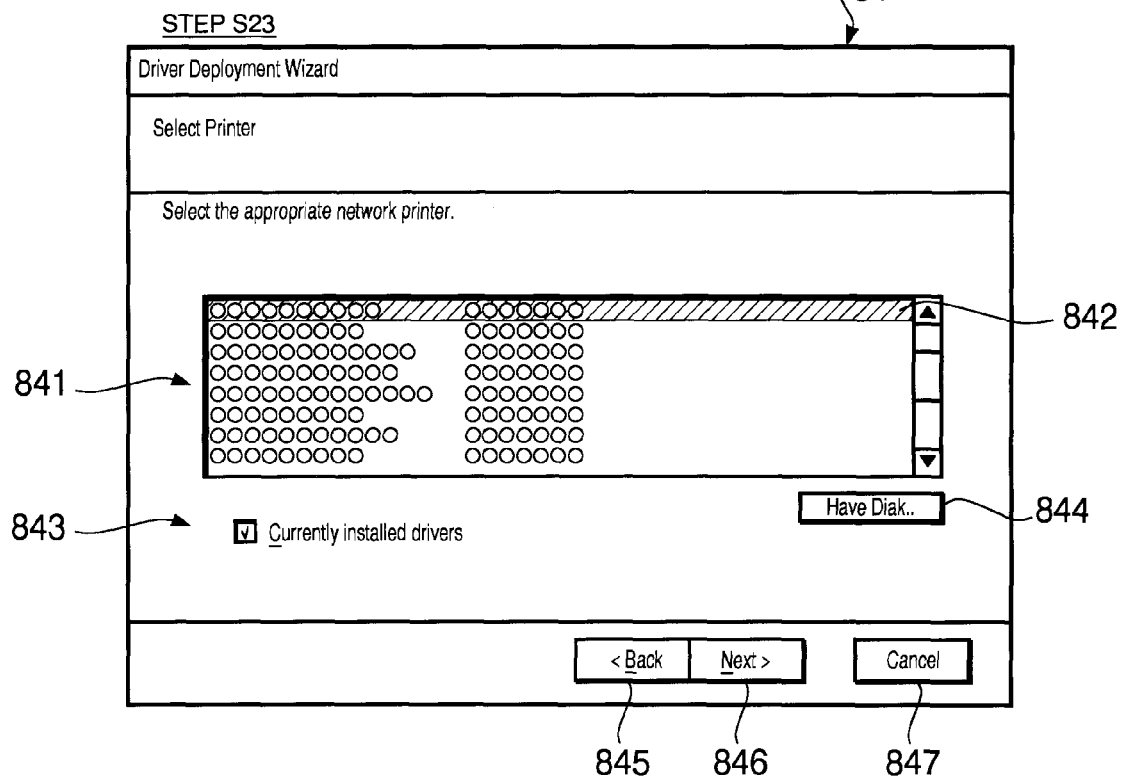
FIG. 16 is a screen image showing an example of a printer driver name selection screen displayed in step S23 in FIG. 7.

Subsequently, the PC 1 executes a process for displaying a display screen 84 (showing currently installed printer drivers) on the display unit 15 (S2). As shown in FIG. 16, the display screen (printer driver name selection screen) 84 includes a (currently installed drivers) check box 843 to be checked by the user for viewing the currently installed printer drivers, a display window 841 for displaying the currently installed printer drivers in response to the checking of the check box 843, a cursor 842 for letting the user make a selection from the display window 841, a search button 844 to be pressed for searching for new printer drivers, a next button 846 to be pressed for advancing to the next step, a back button 845, and a cancel button 847, etc.

Figure 7:
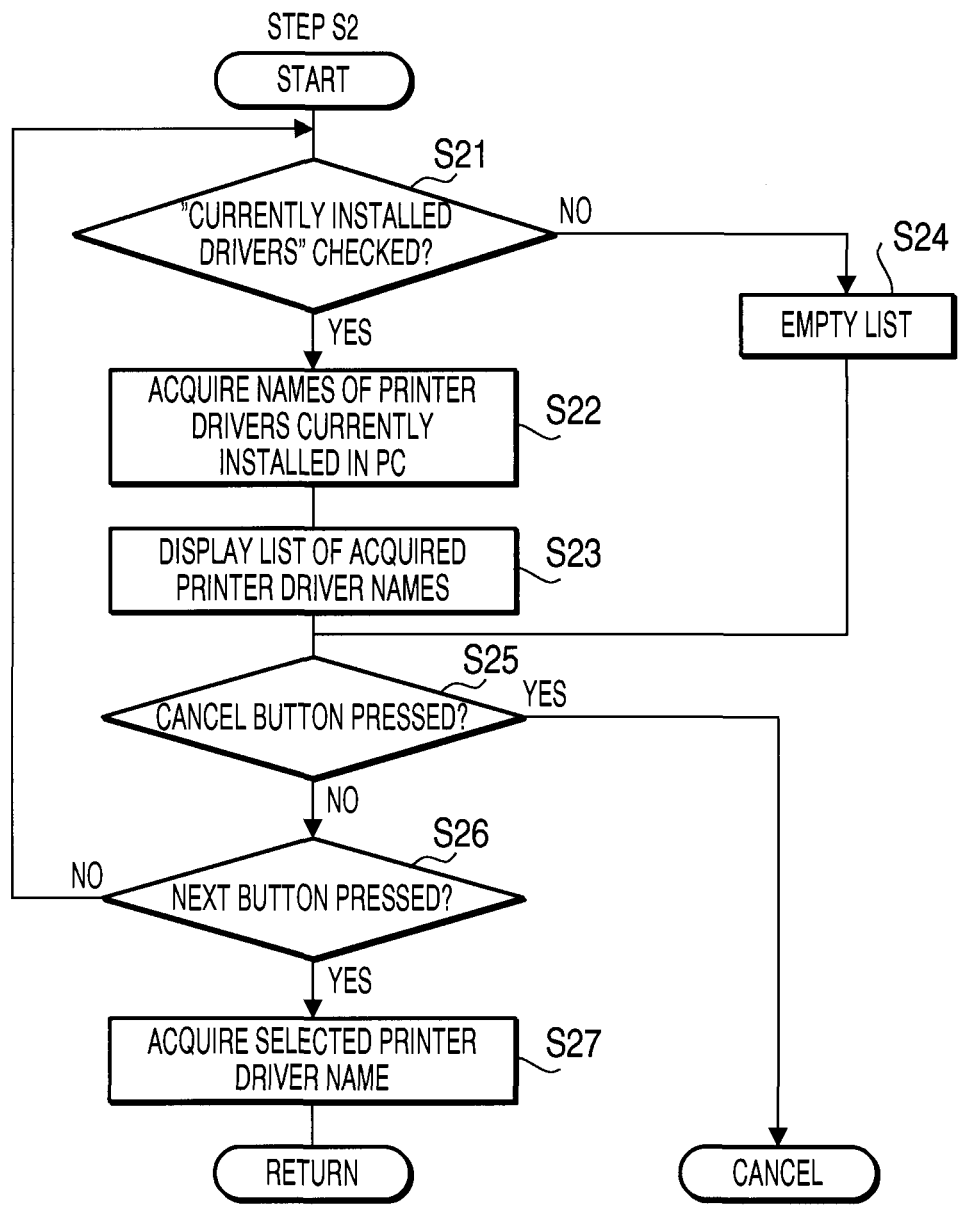
FIG. 7 is a flowchart showing a display process (step S2 in FIG. 6) executed by the PC for displaying currently installed printer drivers.

FIG. 7 is a flow chart showing the details of the step S2 in FIG. 6. When the check box 843 for viewing the currently installed printer drivers is checked by the user (S21: YES), the PC 1 acquires the names of the currently installed printer drivers (S22) and displays a list of the acquired printer driver names in the display window 841 (S23). The printer driver names can be acquired from the virtual printer registry 73 of the registry 7R. On the other hand, when the check box 843 is not checked by the user (S21: NO), the PC 1 empties the display window 841 (S24). After step S23, the PC 1 judges whether a cancel button is pressed (S25). If the cancel button is pressed (S25: YES), the PC1 cancels current process. If the cancel button is not pressed (S25: NO), the PC 1 determines whether the next button 846 is pressed (S26). If the next button is not pressed (S26: NO), the process returns to step S21.

When the next button 846 is pressed by the user (S26: YES), the PC 1 acquires a printer driver name that has been selected by the user with the cursor 842 from the display window 841 displaying the list of the printer driver names acquired in S22 (S27), returns to the process of FIG. 6, and stores the acquired printer driver name (S16). It is assumed here that the "printer driver 71" shown in FIG. 4 has been selected by the user.

Figure 17:
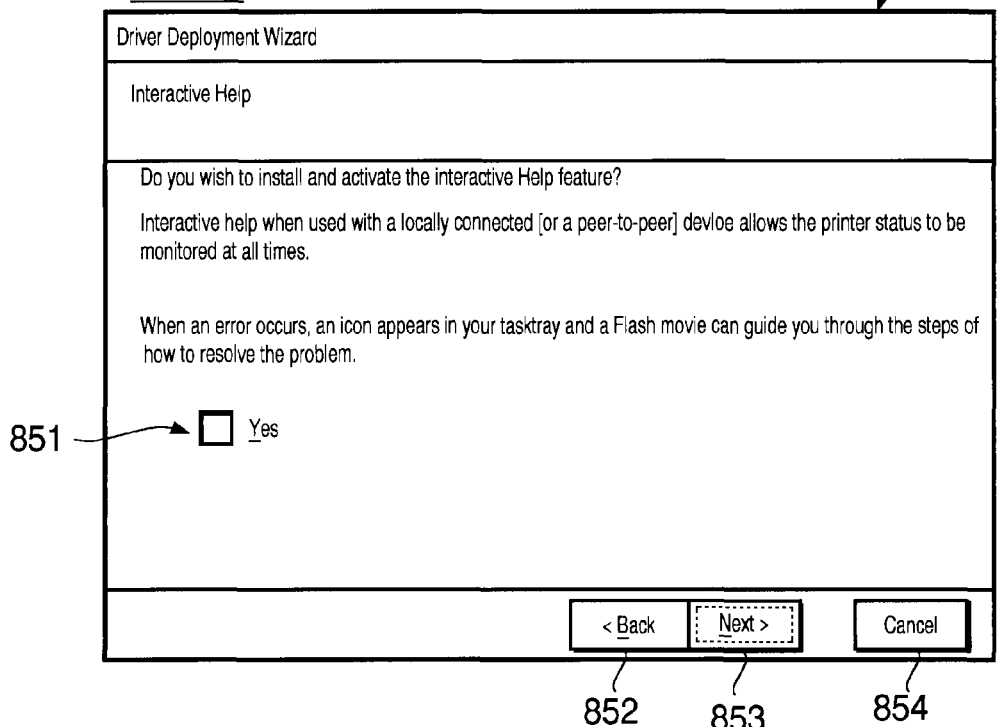
FIG. 17 is a screen image showing an example of a selection screen displayed in step S31 in FIG. 6.

Subsequently, the PC 1 displays a selection screen 85 (for letting the user select whether or not to install a program which implements an interactive help) on the display unit 15 (S31). As shown in FIG. 17, the selection screen 85 includes a check box 851 for letting the user select whether or not to install the interactive help, a next button 853 to be pressed for advancing to the next step, a back button 852, and a cancel button 854, etc. When the next button 853 is pressed by the user, the PC 1 judges whether the check box 851 has been checked or not (S32). If the check box 851 has been checked (S32: YES), the PC 1 stores setting information indicating that the installation of the interactive help has been selected by the user (S33).

Figure 8:
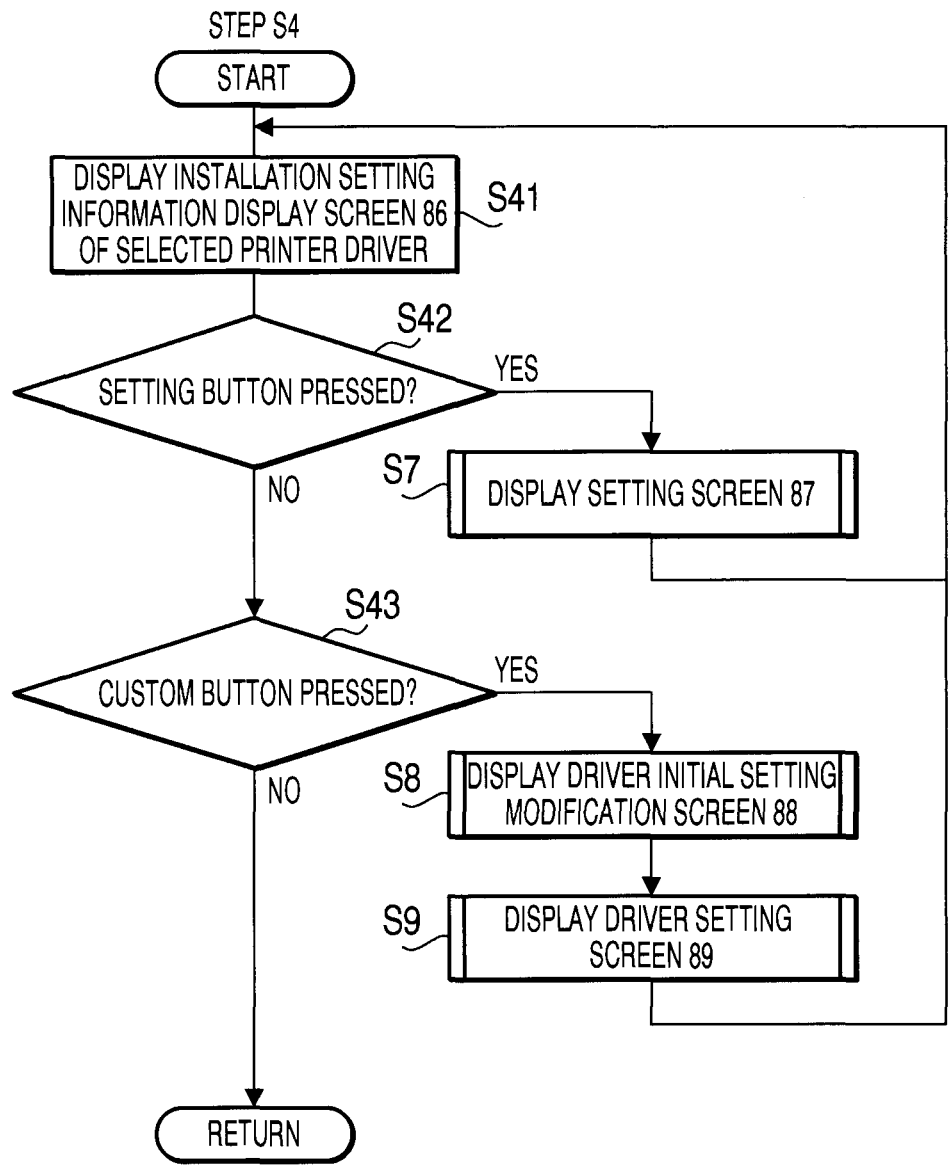
FIG. 8 is a flowchart showing a display process (step S4 in FIG. 6) executed by the PC for displaying information on a selected printer driver.
Figure 18:
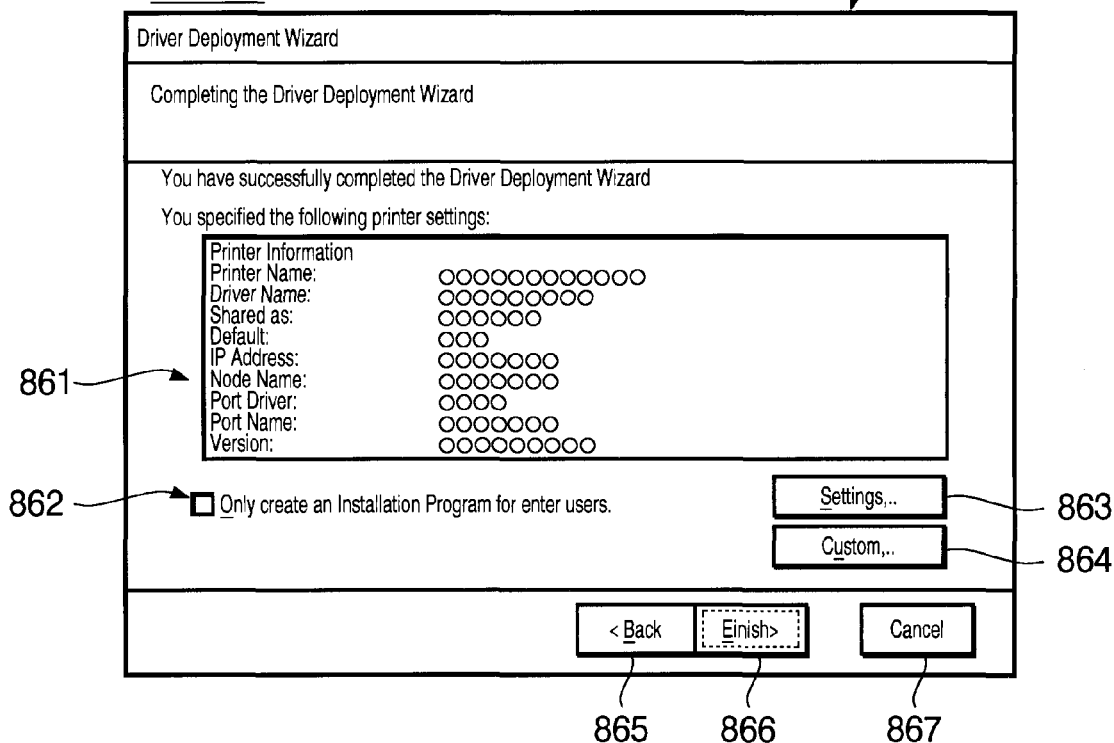
FIG. 18 is a screen image showing an example of an installation setting information display screen displayed in step S41 in FIG. 8.

Subsequently, the PC 1 executes a process for displaying installation setting information regarding the selected printer driver 71 (S4). FIG. 8 is a flow chart showing the details of the step S4 in FIG. 6. The PC 1 first executes a process for displaying an installation setting information display screen 86 regarding the selected printer driver 71 on the display unit 15 (S41). As shown in FIG. 18, the installation setting information display screen 86 includes a display window 861 for displaying the installation setting information (printer name, driver name, port name, etc.), an "Only create an Installation Program for other users" check box 862 (display as a selection receiving step) for letting the user select whether or not to execute a process for creating an installer which will be explained later, a setting button 863 to be pressed for advancing to a process for changing the installation setting information on the printer driver 71, a custom button 864 to be pressed for advancing to a process for changing the initial settings of the printer driver, a finish button 866 to be pressed for confirming the settings, a back button 865, and a cancel button 867, etc. Incidentally, the installation setting information (printer name, driver name, port name, etc.) to be displayed in the display window 861 can be acquired from the aforementioned INI file (setting information file) 74.

Figure 9:
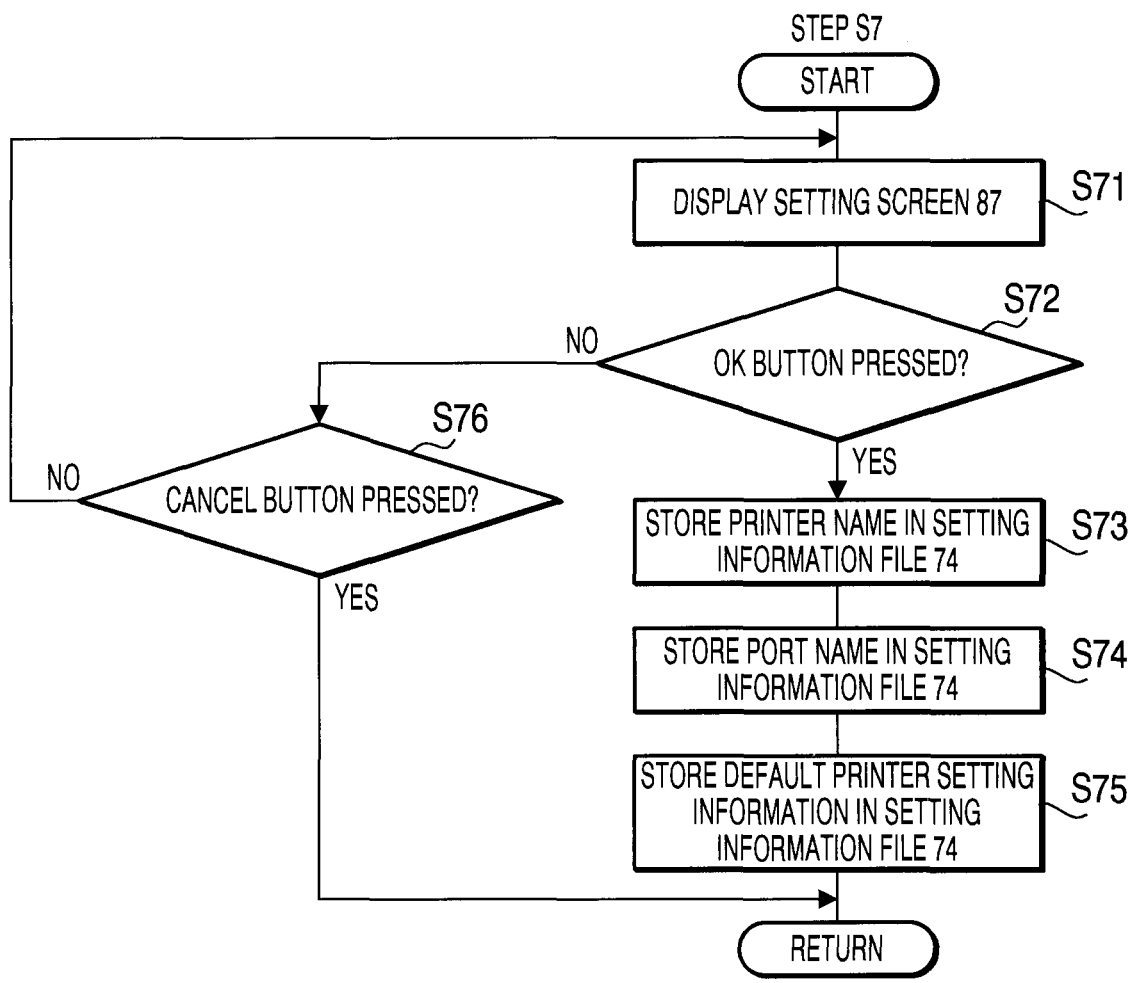
FIG. 9 is a flowchart showing a process (step S7 in FIG. 8) executed by the PC for receiving inputs for changing a printer name and a port name regarding the selected printer driver.
Figure 19:
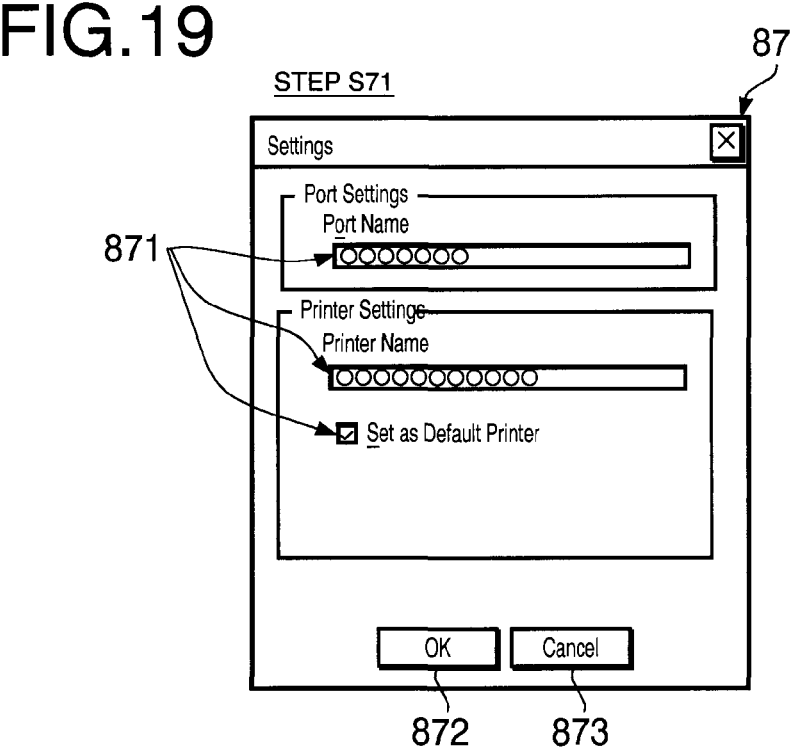
FIG. 19 is a screen image showing an example of a setting screen displayed in step S71 in FIG. 9.

When the setting button 863 on the installation setting information display screen 86 is pressed by the user (S42: YES), the PC 1 executes a process for receiving inputs for changing the printer name and port name regarding the selected printer driver 71 (S7). FIG. 9 is a flow chart showing the details of the step S7 in FIG. 8. The PC 1 first displays a setting screen 87 (for receiving inputs for changing the printer name and port name regarding the selected printer driver 71) on the display unit 15 (S71). As shown in FIG. 19, the setting screen 87 includes setting windows 871 for letting the user set the port name, the printer name and default information, an OK button 872 to be pressed for confirming the settings, and a cancel button 873, etc.

Figures 21, 22:
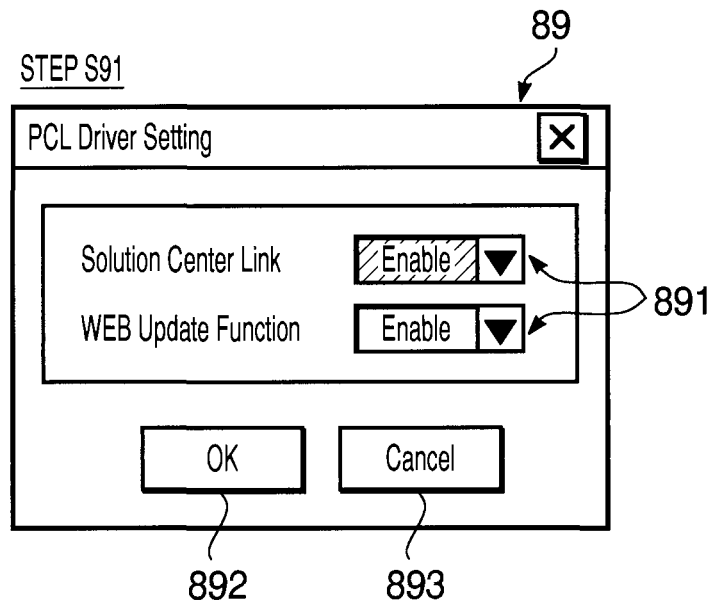
FIG. 21 is a screen image showing an example of a setting screen displayed in step S91 in FIG. 11.
FIG. 22 is a table showing an example of the contents of an INI file (setting information file).

When the OK button 872 is pressed by the user (S72: YES), the PC 1 stores the information on the setting screen 87 in the INI file (setting information file) 74 (S73-S75). An example of the contents of the INI file (setting information file) 74 is shown in FIG. 22, in which values have been set for the port name, the printer name and the default information.

The port name, the printer name and the default information are included in the aforementioned concept "control parameters to be used by the device driver for controlling the device" since they are information to be used by the printer driver 71 for the communication with a printer (specifically, for the selection of a communication interface). Therefore, the step S7 (S71-S76) explained above corresponds to the aforementioned "setting acquiring step". Among the steps S71-S76, the step S71 corresponds to the aforementioned "input receiving step", while the steps S73-S75 correspond to the aforementioned "setting creating step". The INI file (setting information file) 74 stored (created) by the steps S73-S75 is included in the aforementioned concept "initial setting file describing control parameters that have incorporated the inputs received by the input receiving step".

Returning to the explanation of FIG. 8, when the custom button 864 on the installation setting information display screen 86 is pressed by the user (S43: YES), the PC 1 executes a process for acquiring the INI file (initial setting file) 72 of the selected printer driver 71 (S8: setting acquiring step).

Incidentally, the PC 1 executes the step S8 (setting acquiring step) by calling up and executing a function of the printer driver 71 for displaying a setting screen (the aforementioned "user interface"). Specifically, the setting screen (user interface) is displayed according to the aforementioned configuration file 712 (see FIG. 4) included in the printer driver 71.

Figure 10:
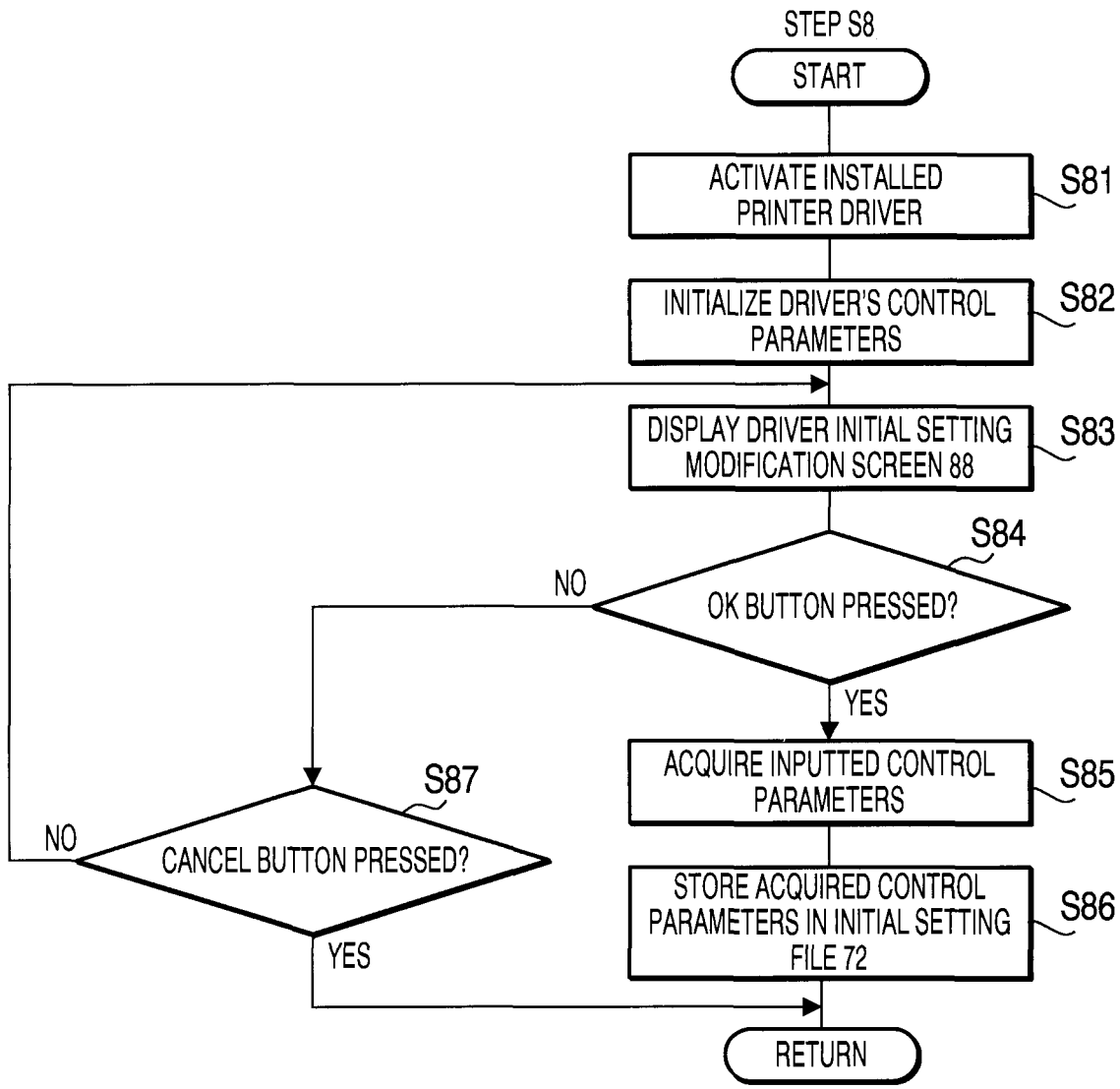
FIG. 10 is a flowchart showing a process (step S8 in FIG. 8) executed by the PC for acquiring an INI file (initial setting file) of the selected printer driver.

FIG. 10 is a flow chart showing the details of the step S8 in which the PC 1 calls up and executes the function of the printer driver 71 for displaying the setting screen (user interface: so-called "properties screen"). The PC 1 first activates the printer driver 71 from the system folder 7S in which the printer driver 71 has been installed (S81), reads out the INI file (initial setting file) 72 and initializes the control parameters (S82), and displays a driver initial setting modification screen 88 (for receiving inputs for changing the control parameters) on the display unit 15 (S83: input receiving step).

Figure 20:
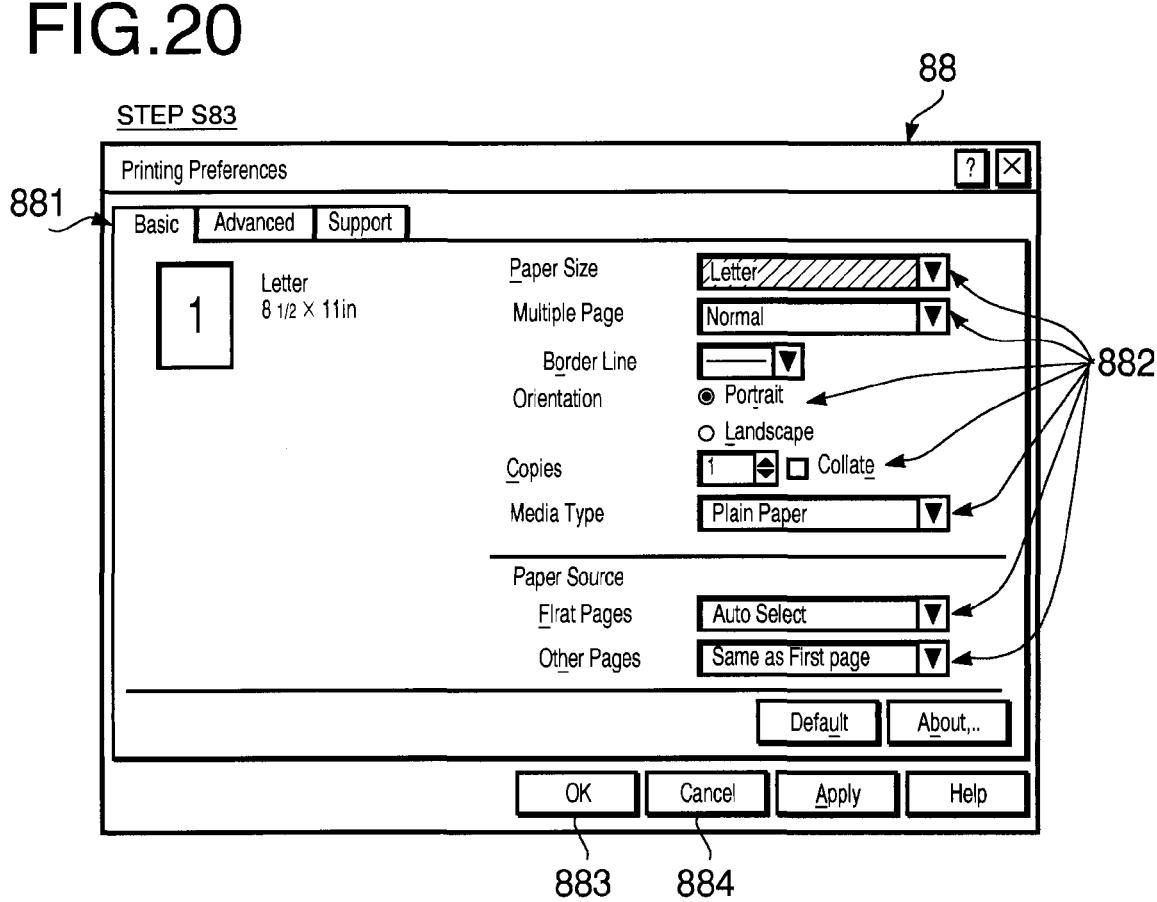
FIG. 20 is a screen image showing an example of a driver initial setting modification screen displayed in step S83 in FIG. 10.

As shown in FIG. 20, the driver initial setting modification screen 88 includes tabs 881 for switching the screen, setting windows 882 for letting the user set (change) the control parameters, an OK button 883 to be pressed for confirming the settings, etc.

The control parameters displayed on the driver initial setting modification screen 88 include values representing instructions and values that are used for creating data to be transmitted to the printer for controlling the printer, such as those regarding paper size, multipage printing, printing direction (orientation), the number of copies, paper type (media type), paper tray, etc.

Figure 23:
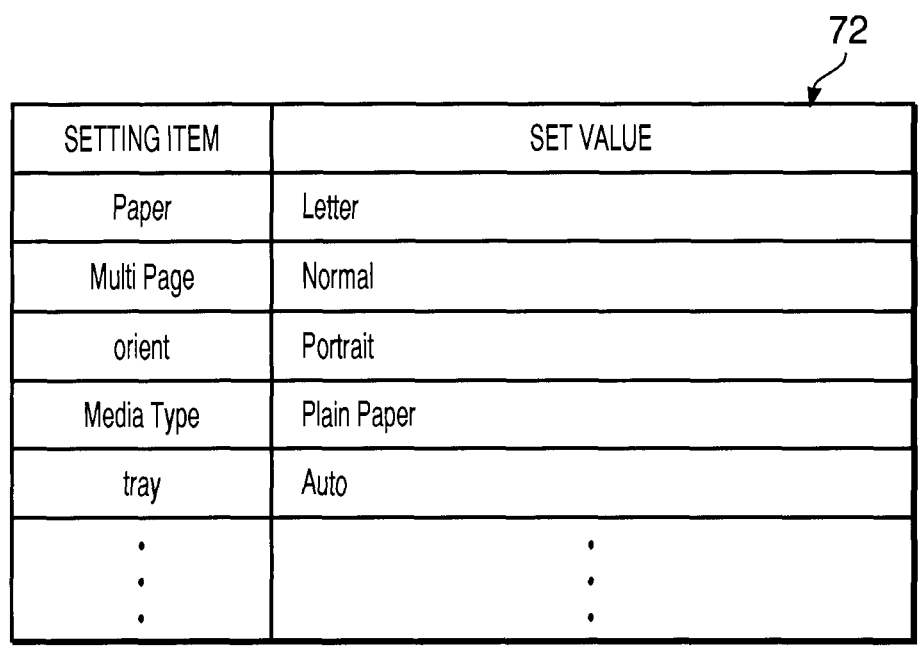
FIG. 23 is a table showing an example of the contents of an INI file (initial setting file).

When the OK button 883 on the driver initial setting modification screen 88 is pressed by the user (S84: YES), the PC 1 acquires the control parameters that have been inputted to the driver initial setting modification screen 88 (S85) and stores the acquired control parameters in the INI file (initial setting file) 72, that is, creates a new INI file (initial setting file) 72 containing the acquired control parameters (S86: setting creating step). An example of the contents of the INI file (initial setting file) 72 is shown in FIG. 23. If the OK button 883 is not pressed (S84: NO), the PC 1 judges whether a cancel button is pressed (S87). If the cancel button is pressed (S87: YES), the PC 1 returns to the process of FIG. 8. If the cancel button is not pressed (S87: NO), the process returns to step S83.

The PC 1 creates the INI file (initial setting file) 72 according to the operation of the installed printer driver 71 as above. After ending the step S8 (FIG. 10), the PC 1 returns to the process of FIG. 8.

Figure 11:
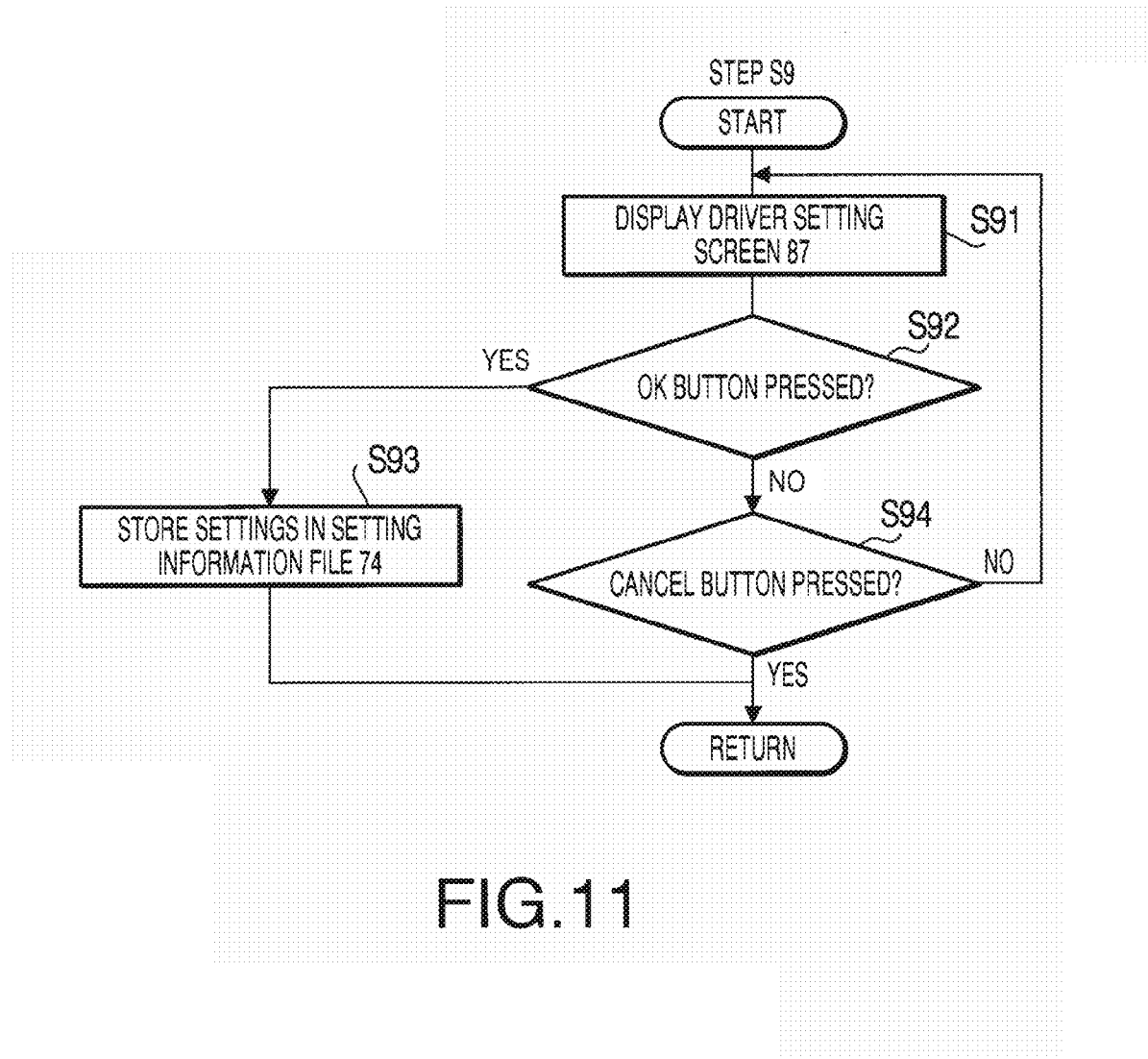
FIG. 11 is a flowchart showing a process (step S9 in FIG. 8) executed by the PC for receiving inputs for changing a center connection setting and an update setting of the printer driver.

Subsequently, the PC 1 executes a process for receiving inputs for changing a center connection setting and an update setting of the printer driver 71 (S9). FIG. 11 is a flow chart showing the details of the step S9 in FIG. 8. The PC 1 first displays a setting screen 89 (for receiving inputs for changing the center connection setting and the update setting of the printer driver 71) on the display unit 15 (S91). As shown in FIG. 21, the setting screen 89 includes setting windows 891 for letting the user set the enabling/disabling of the center connection setting and the update setting, an OK button 892 to be pressed for confirming the settings, a cancel button 893, etc.

When the OK button 892 is pressed by the user (S92: YES), the PC 1 stores the information on the setting screen 89 in the INI file (setting information file) 74 (S93). An example of the contents of the INI file (setting information file) 74 is shown in FIG. 22, in which values have been set for the center connection setting and the update setting in addition to the aforementioned port name, printer name and default information. If the OK button 892 is not pressed by the user (S92: NO), the PC 1 judges whether a cancel button is pressed (S94). If the cancel button is pressed (S94: YES), the PC1 ends current process. If the cancel button isn't pressed (S94: NO), the PC1 executes a process for returning to step S91.

Returning to the flow chart of FIG. 8, after ending the step S9, the PC 1 displays the installation setting information display screen 86 (see FIG. 18) again (S41). Returning to the flow chart of FIG. 6, when the finish button 866 on the display screen 86 (for confirming the settings explained above) is pressed by the user (S51: YES), the PC 1 judges whether the "Only create an Installation Program for other users" check box 862 (for receiving a selection input specifying whether to execute an installer creating step (S6) or an installation step (S54)) on the display screen 86 has been checked or nor (S53). If the finish button 866 is not pressed (S51: NO), the PC 1 judges whether a cancel button is pressed (S52). If the cancel button is pressed (S52: YES), the PC1 cancels current process. If the cancel button is not pressed (S52: NO), the process returns to step S4. Here, the display screen 86 functions also as a selection screen for receiving the selection input in the selection receiving step.

Figure 12:
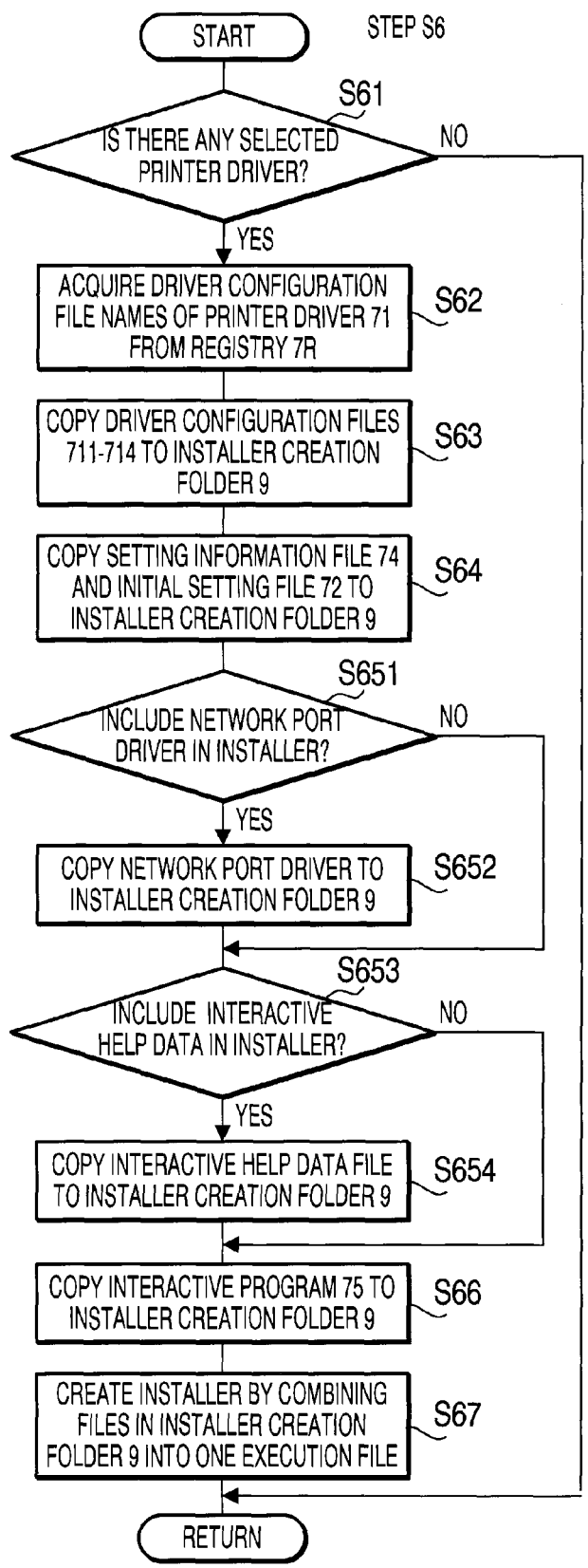
FIG. 12 is a flowchart showing a process (step S6 in FIG. 6) executed by the PC for creating an installer.
Figure 24:
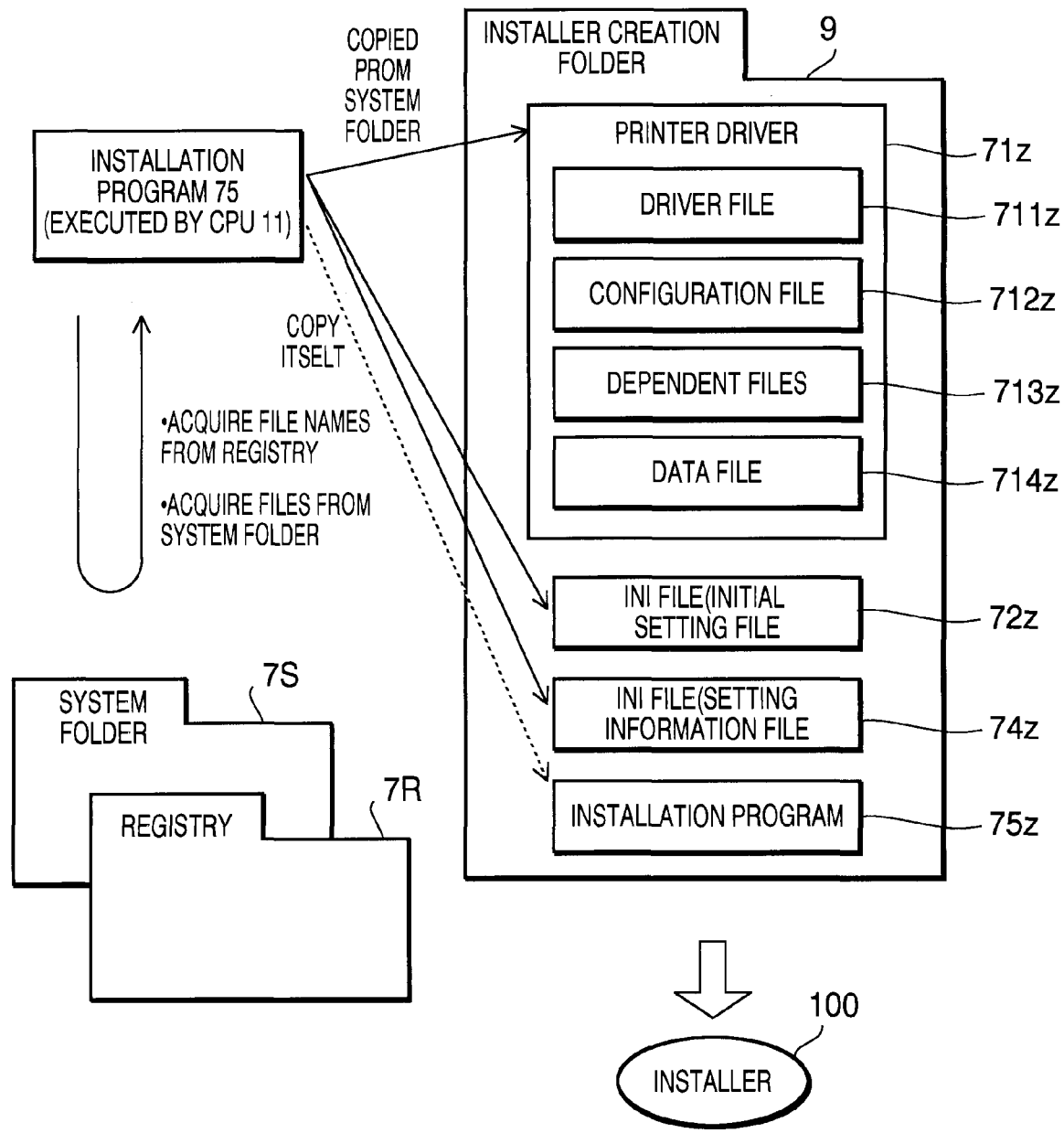
FIG. 24 is an explanatory drawing schematically showing the contents of the step S6 in FIG. 6.

If the "Only create an Installation Program for other users" check box 862 has been checked (S53: YES), the PC 1 executes a process for creating an installer containing the INI file (initial setting file) 72 and the INI file (setting information file) 74 which have been created as above (S6). FIG. 12 is a flow chart showing the details of the step S6 in FIG. 6. FIG. 24 is an explanatory drawing schematically showing the contents of the step S6.

Referring to FIG. 12, when there exists a selected printer driver 71 (S61: YES), the PC 1 acquires the file names of the aforementioned driver configuration files 711-714 forming the printer driver 71 from the virtual printer registry 73 of the registry 7R (S62).

Subsequently, the PC 1 acquires the driver configuration files 711-714 from the system folder 7S (in which the printer driver 71 has been installed) and copies them to an installer creation folder 9 (S63: configuration extracting step). The driver configuration files 711-714 which have been copied to the installer creation folder 9 will hereinafter be referred to as "driver configuration files 711Z-714Z" by attaching "Z" to the reference numerals (ditto for other files copied to the installer creation folder 9).

Subsequently, the PC 1 copies the INI file (initial setting file) 72 and the INI file (setting information file) 74 created as above to the installer creation folder 9 (S64).

Subsequently, if a port driver has been selected in the port driver selection window 822 of the network printer selection screen 82 (see FIG. 14) displayed in the step S12 (S651: YES), the PC 1 copies the port driver (unshown) to the installer creation folder 9 (S652).

Subsequently, if the installation of the interactive help has been selected in the check box 851 on the selection screen 85 (see FIG. 17) displayed in the step S31(S653: YES), the PC 1 copies an interactive help data file (unshown) to the installer creation folder 9 (S654).

Subsequently, the PC 1 copies the installation program 75 to the installer creation folder 9 (S66), or the PC 1 may also copy an ordinary installation program (not having such an installer creating function) to the installer creation folder 9.

Finally, the PC 1 creates an installer 100 by combining the printer driver 71Z (driver configuration files 711Z-714Z), the INI file (initial setting file) 72Z, the INI file (setting information file) 74Z and the installation program 75Z together (S67), by which the installer creating step (S6) is completed.

Figure 25:
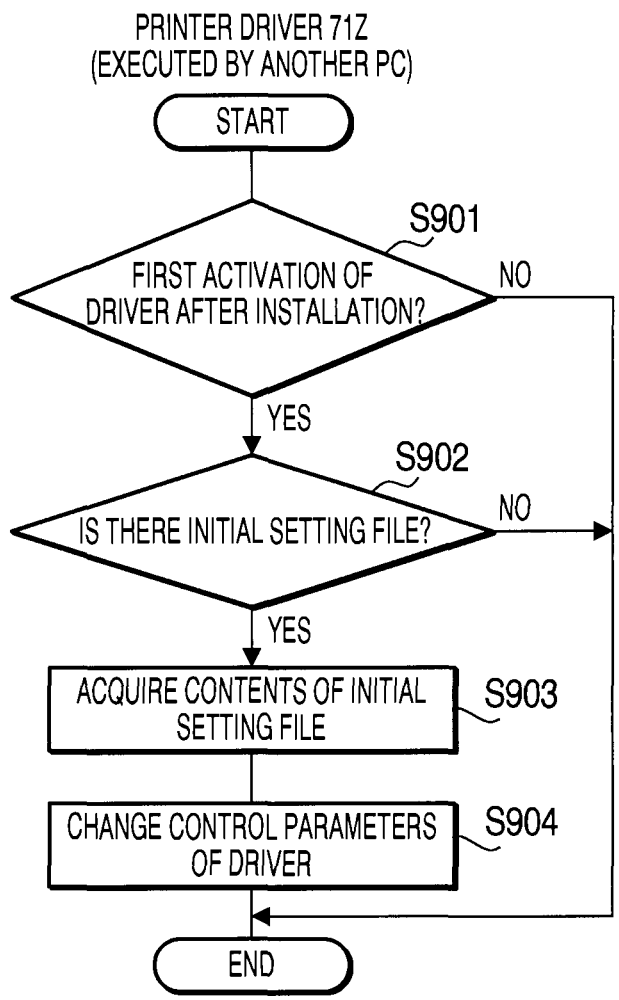
FIG. 25 is a flowchart showing the operation of the printer driver installed in another PC by the installer created in the step S6 in FIG. 6.

The installer 100 created as above is capable of installing the printer driver 71Z (operating according to the INI files 72Z and 74Z created and copied as above) in another PC (hereinafter referred to as an "external PC"), for example, when the installation program 75Z contained in the installer 100 is executed by the external PC. FIG. 25 is a flow chart showing the operation of the printer driver 71Z installed in the external PC by the installer 100. When the printer driver 71Z is activated for the first time after its installation in the external PC (S901: YES), the printer driver 71Z judges whether there exists the INI file (initial setting file) 72Z or not (S902). If the INI file 72Z exists (S902: YES), the printer driver 71Z acquires the contents of the INI file 72Z (S903) and thereby changes its own control parameters (S904).

Returning to the flow chart of FIG. 6, if the "Only create an Installation Program for other users" check box 862 has not been checked (S53: NO), the PC 1 executes a process for installing the printer driver 71 in the PC 1 itself (S54: installation step). For example, step S54 is executed when the printer driver 71 (see FIG. 4) already installed in the PC 1 has a bug and a revised printer driver (from which the bug is eliminated) is installed in the PC 1 again.

In the installation step S54, the INI file (initial setting file) 72 and the INI file (setting information file) 74 created as above can be used for the installation. Specifically, when the revised printer driver contained in the installer 7 (see FIG. 5) is installed in the PC 1, the settings of the printer driver 71 already installed in the PC 1 can also be applied to the revised printer driver to be newly installed in the PC 1.

While a description has been given above of a preferred embodiment in accordance with the present invention, the present invention is not to be restricted by the particular illustrative embodiment and a variety of modifications, design changes, etc. are possible without departing from the scope and spirit of the present invention described in the appended claims. For example, while a printer driver that has been installed in a computer (PC 1) was used as an object of the printer driver display (device driver display) in the step S2 in FIG. 6 (the steps S21-S27 in FIG. 7) in the above embodiment, a printer driver whose driver configuration files and INF file (describing its installation procedure) have been stored in the computer may also be used as an object of the printer driver display (device driver display).

What is claimed is:

1. A non-transitory computer readable medium having computer readable instructions stored thereon, which, when executed by a processor, are configured to:
   display, on a display of an information processing device including the processor, a list of a plurality of device drivers stored in storage of the information processing device, wherein each of the plurality of device drivers having been installed in the information processing device is configured to control a corresponding device;
   receive a first user input indicating a first device driver of the plurality of device drivers;
   in response to receiving the first user input indicating the first device driver,
      display a plurality of setting screens on the display of the information processing device, wherein the plurality of setting screens enables user input for indicating a plurality of additional files for including in an installer of the first device driver;
      receive second user inputs indicating requests to include the plurality of additional files in the installer, wherein the plurality of additional files include a port driver and an interactive help file; and
      copy, by the information processing device, the plurality of additional files;
   extract driver configuration files forming the first device driver from the storage of the information processing device, wherein the first device driver is configured to control a first device, and wherein the driver configuration files comprise a print condition;
   display, on the display of the information processing device, a print condition modification screen indicating the print condition;
   receive a third user input indicating a modification of the print condition;
   update, by the information processing device, the print condition based on the third user input;
   receive a fourth user input indicating one of a first installation mode and a second installation mode, wherein the first installation mode indicates that the installer is to be created without installing the first device driver, and wherein the second installation mode indicates that the first device driver is to be installed without creating the installer;
   determine whether the received fourth user input indicates the first installation mode or the second installation mode;
   in response to determining that the received fourth user input indicates the first installation mode,
      create, in the information processing device, an initial setting file, wherein the initial setting file is created by operation of the first device driver stored in the information processing device;
      describe, in the initial setting file, control parameters to be used by the first device driver for controlling the first device based on the received third user input;
      copy, by the information processing device, the first device driver stored in the information processing device;
      copy, by the information processing device, an installer program from the first device driver stored in the information processing device; and
      create, in the information processing device, the installer which includes the driver configuration files, the initial setting file, the copied first device driver, the copied installer program, and the copied plurality of additional files, without executing installation of the first device driver, wherein the installer is configured to install the first device driver configured to control the first device in accordance with the control parameters described in the initial setting file; and
   in response to determining that the received fourth user input indicates the second installation mode, install the first device driver in the information processing device so that the information processing device is configured to be controlled in accordance with control parameters described in the initial setting file based on the received third user input without executing creation of the installer,
   wherein the print condition includes at least one of paper size, multipage printing, printing direction, number of copies, paper type, and paper tray.

2. The non-transitory computer readable medium according to claim 1, wherein the instructions are further configured to:
   in response to receiving the first user input indicating the first device driver, display a print condition confirmation screen on the display of the information processing device, wherein the print condition confirmation screen includes the print condition;
   receive a fifth user input indicating a request to modify the print condition; and
   in response to receiving the fifth user input, display the print condition modification screen on the display of the information processing device.

3. The non-transitory computer readable medium according to claim 1, wherein the plurality of setting screens enables user input for indicating a port to be used by the first device driver.

4. An installer creating method, comprising:
   a first displaying step of displaying, on a display of an information processing device including a processor, a list of a plurality of device drivers stored in storage of the information processing device, wherein each of the plurality of device drivers having been installed in the information processing device is configured to control a corresponding device;
   a first input receiving step of receiving a first user input indicating a first device driver of the plurality of device drivers;
   in response to receiving the first user input indicating the first device driver,
      second displaying steps of displaying a plurality of setting screens on the display of the information processing device, wherein the plurality of setting screens enables user input for indicating a plurality of additional files for including in an installer of the first device driver;

a second input receiving step of receiving second user inputs indicating requests to include the plurality of additional files in the installer of the first device driver, wherein the plurality of additional files include a port driver and an interactive help file; and a first copying step of copying, by the information processing device, the plurality of additional files;

a configuration extracting step of extracting driver configuration files forming the first device driver from the storage of the information processing device, wherein the first device driver is configured to control a first device, and wherein the driver configuration files comprise a print condition;

a third displaying step of displaying, on the display of the information processing device, a print condition modification screen indicating the print condition;

a third input receiving step of receiving third user inputs of control parameters to be used by the first device driver for controlling the first device, one of the third user inputs indicating a modification of the print condition;

an updating step of updating, by the information processing device, the print condition based on the one of the third user inputs;

a fourth input receiving step of receiving a fourth user input indicating one of a first installation mode and a second installation mode, wherein the first installation mode indicates that the installer of the first device driver is to be created without installing the first device driver, and wherein the second installation mode indicates that the first device driver is to be installed without creating the installer of the first device driver;

an installation mode determining step of determining whether the received fourth user input indicates the first installation mode or the second installation mode;

in response to determining by the installation mode determining step that the received fourth user input indicates the first installation mode,
- a setting creating step of creating, in the information processing device, an initial setting file, wherein the initial setting file is created by operation of the first device driver stored in the information processing device, and wherein the initial setting file describes the control parameters to be used by the first device driver for controlling the first device based on the one of the third user inputs received by the third input receiving step;
- a second copying step of copying, by the information processing device, the first device driver stored in the information processing device;
- a third copying step of copying, by the information processing device, an installer program from the first device driver stored in the information processing device; and
- an installer creating step of creating, in the information processing device, the installer which includes the driver configuration files, the initial setting file, the copied first device driver, the copied installer program, and the copied plurality of additional files, without executing installation of the first device driver, wherein the installer is configured to install the first device driver configured to control the first device in accordance with the control parameters described in the initial setting file; and in response to determining by the installation mode determining step that the received fourth user input indicates the second installation mode, a device driver installation step of installing the first device driver in the information processing device so that the information processing device is configured to be controlled in accordance with control parameters described in the initial setting filed based on the one of the third user inputs without executing creation of the installer, wherein the print condition includes at least one of paper size, multipage printing, printing direction, number of copies, paper type, and paper tray.

5. The installer creating method according to claim 4, further comprising:

in response to receiving the first user input indicating the first device driver, a fourth displaying step of displaying, on the display of the information processing device, a print condition confirmation screen, wherein the print condition confirmation screen includes the print condition;

a fifth input receiving step of receiving a fifth user input indicating a request to modify the print condition; and in response to receiving the fifth user input, a fifth displaying step of displaying, on the display of the information processing device, the print condition modification screen.

6. The installer creating method according to claim 4, wherein the plurality of setting screens enables user input for indicating a port to be used by the first device driver.

7. An information processing device, comprising:

a storage in which a plurality of device drivers are stored therein, wherein each of the plurality of device drivers having been installed in the information processing device is configured to control a corresponding device, and in which an installer creating program for creating an installer is stored therein, wherein the installer is configured to install a first device driver of the plurality of device drivers;

an input receiving unit which receives a first user input indicating the first device driver of the plurality of device drivers, receives second user inputs indicating requests to include a plurality of additional files in the installer, wherein the plurality of additional files include a port driver and an interactive help file, receives third user inputs of control parameters to be used by the first device driver for controlling a first device, one of the third user inputs indicating a modification of a print condition, and receives a fourth user input indicating one of a first installation mode and a second installation mode, wherein the first installation mode indicates that the installer is to be created without installing the first device driver, and wherein the second installation mode indicates that the first device driver is to be installed without creating the installer; and a processor configured to execute the installer creating program that, when executed, causes the information processing device to provide:
- a display unit which displays a list of the plurality of device drivers, which displays, in response to the input receiving unit receiving the first user input indicating the first device driver, a plurality of setting screens which enables user input for indicating the plurality of additional files for including in the installer, and which displays a print condition modification screen indicating the print condition;
- a configuration extracting unit which extracts driver configuration files forming the first device driver from the storage of the information processing device including a computer, wherein the first device driver is configured to control the first device;

an update unit which updates the print condition based on the one of the third user inputs;

an installation mode determining unit which determines whether the received fourth user input indicates the first installation mode or the second installation mode;

a setting creating unit which, in response to the installation mode determining unit determining that the received fourth user input indicates the first installation mode, creates an initial setting file by operation of the first device driver stored in the information processing device, wherein the initial setting file describes control parameters based on the one of the third user inputs;

a copying unit which copies the first device driver stored in the information processing device, copies an installer program from the first device driver stored in the information processing device, and copies the plurality of additional files; and an installer creating unit which, in response to the installation mode determining unit determining that the received fourth user input indicates the first installation mode, creates, in the information processing device, the installer which includes the driver configuration files, the initial setting file, the copied first device driver, the copied installer program, and the copied plurality of additional files, without executing installation of the device driver, wherein the installer is configured to install the first device driver configured to control the first device in accordance with the control parameters described in the initial setting file; and a device driver installing unit which, in response to determining that the received fourth user input indicates the second installation mode, installs the first device driver in the information processing device so that the information processing device is configured to be controlled in accordance with control parameters described in the initial setting file based on the one of the third user inputs without executing creation of the installer, wherein the print condition includes at least one of paper size, multipage printing, printing direction, number of copies, paper type, and paper tray.

8. The information processing device according to claim 7, wherein:

in response to receiving the first user input indicating the first device driver, the display unit further displays a print condition confirmation screen, wherein the print condition confirmation screen includes the print condition;

the input receiving unit further receives a fifth user input indicating a request to modify the print condition; and in response to receiving the fifth user input, the display unit further displays the print condition modification screen.

9. The information processing device according to claim 7, wherein the plurality of setting screens enables user input for indicating a port to be used by the first device driver.

* * * * *